United States Patent
Jolley et al.

(10) Patent No.: US 10,174,198 B2
(45) Date of Patent: Jan. 8, 2019

(54) SELF-HEALING POLYMER MATERIALS FOR WIRE INSULATION, POLYIMIDES, FLAT SURFACES, AND INFLATABLE STRUCTURES

(75) Inventors: Scott T. Jolley, Titusville, FL (US); Martha K. Williams, Titusville, FL (US); Tracy L. Gibson, Melbourne, FL (US); Trent M. Smith, Satellite Beach, FL (US); Anne J. Caraccio, Cape Canaveral, FL (US); Wenyan Li, Orlando, FL (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 1771 days.

(21) Appl. No.: 13/523,806

(22) Filed: Jun. 14, 2012

(65) Prior Publication Data
US 2012/0321828 A1    Dec. 20, 2012

Related U.S. Application Data

(60) Provisional application No. 61/497,614, filed on Jun. 16, 2011.

(51) Int. Cl.
*C08L 79/08* (2006.01)
*C08G 18/50* (2006.01)
(Continued)

(52) U.S. Cl.
CPC ............. *C08L 79/08* (2013.01); *B32B 7/02* (2013.01); *B32B 7/04* (2013.01); *B32B 27/08* (2013.01);
(Continued)

(58) Field of Classification Search
CPC . B32B 2379/08; B32B 2457/04; B32B 27/08; B32B 27/34; B32B 7/02; B32B 7/04; C08L 79/08; C08G 18/5024; C08G 18/61; C08G 18/755; C08G 18/7621; Y10T 428/1379; Y10T 428/24942
(Continued)

(56) References Cited

U.S. PATENT DOCUMENTS 5,705,574 A    1/1998  Lubowitz et al.
7,285,306 B1  10/2007  Parrish
(Continued)

FOREIGN PATENT DOCUMENTS

JP    11246824 A  *  9/1999

OTHER PUBLICATIONS

Machine translation of JP 11246824 A, retrieved Feb. 17, 2016.*
(Continued)

*Primary Examiner* — Callie E Shosho
*Assistant Examiner* — Krupa Shukla
(74) *Attorney, Agent, or Firm* — Jonathan J. Leahy; Mark W. Homer; Mark P. Dvorscak

(57) ABSTRACT

Materials based on low melt polyimide, polyurea, or polyurethane chemistry have been developed which exhibit self-healing properties. These high performance polymers can be utilized either by themselves or in combination with microcapsule technology to deliver self-healing properties to electrical wire insulation or in other high performance, thin wall technologies such as inflatable structures.

15 Claims, 11 Drawing Sheets

(51) Int. Cl.

| | |
|---|---|
| *C08G 18/61* | (2006.01) |
| *C08G 18/75* | (2006.01) |
| *C08G 18/76* | (2006.01) |
| *C08L 75/02* | (2006.01) |
| *B32B 7/02* | (2006.01) |
| *B32B 7/04* | (2006.01) |
| *B32B 27/08* | (2006.01) |
| *B32B 27/34* | (2006.01) |
| *C08K 9/10* | (2006.01) |
| *H01B 3/30* | (2006.01) |

(52) U.S. Cl.
CPC .......... *B32B 27/34* (2013.01); *C08G 18/5024* (2013.01); *C08G 18/61* (2013.01); *C08G 18/755* (2013.01); *C08G 18/7621* (2013.01); *C08L 75/02* (2013.01); *B32B 2379/08* (2013.01); *B32B 2457/04* (2013.01); *C08K 9/10* (2013.01); *H01B 3/306* (2013.01); *Y10T 428/1379* (2015.01); *Y10T 428/24942* (2015.01)

(58) Field of Classification Search
USPC ........ 428/212, 220, 36.6; 524/104; 525/418; 528/38, 68
See application file for complete search history.

(56) References Cited

U.S. PATENT DOCUMENTS

| | | | | |
|---|---|---|---|---|
| 8,623,253 | B2* | 1/2014 | Jolley | B29C 73/02 264/234 |
| 2006/0038745 | A1* | 2/2006 | Naksen | G06F 1/1624 345/30 |
| 2006/0141258 | A1* | 6/2006 | Terada | B32B 27/06 428/411.1 |
| 2006/0271135 | A1* | 11/2006 | Minar | A61L 29/085 607/116 |
| 2008/0058476 | A1* | 3/2008 | Whiteker | C08G 73/10 525/418 |
| 2009/0019784 | A1 | 1/2009 | Tinker et al. | |
| 2009/0191402 | A1 | 7/2009 | Beiermann et al. | |
| 2010/0119704 | A1 | 5/2010 | Hemmelgarn et al. | |
| 2010/0279050 | A1 | 11/2010 | Ootake et al. | |
| 2010/0305234 | A1 | 12/2010 | Calle et al. | |
| 2010/0320421 | A1 | 12/2010 | Calle et al. | |
| 2011/0039980 | A1 | 2/2011 | Caruso et al. | |
| 2011/0212334 | A1 | 9/2011 | Jolley et al. | |

OTHER PUBLICATIONS

M.M. Caruso et al. 2010. "Robust Double-Walled Microcapsules for Self-Healing Polymeric Materials." Applied Materials and Interfaces 2:1195-1199.

E.J. Brandon et al. 2010. "Structural health management technologies for inflatable/deployable structures: integrating sensing and self-healing." Acta Astronautica 68:883-903.

D.A. McIlroy et al. 2010. "Microencapsulation of a Reactive Liquid-Phase Amine for Self-Healing Epoxy Composites." Macromolecules 43:1855-1859.

B.J. Blaiszik et al. 2010. "Self-Healing Polymers and Composites." Annual Review Materials Research 40:179-211.

A.B. South et al. 2010. "Autonomic Self-Healing of Hydrogel Thin Films." Angewandte Chemie Int. Ed. 49:767-771.

R.J. Varley et al. 2008. "Development of a quasi-static test method to investigate the origin of self-healing in ionomers under ballistic conditions." Polymer Testing 27:11-19.

R.J. Varley et al. 2008. "Toward an understanding of thermally activated self-healing of an ionomer system during ballistic penetration." Acta Materiala 56:5737-5750.

M.W. Keller et al. 2007. "A Self-Healing Poly(Dimethyl Siloxane) Elastomer." Advanced Functional Materials 17:2399-2404.

J.Ferl et al. "Self-Healing Technology for Gas Retention Structures and Space Suit Systems." SAE Technical Paper 2007-01-3211.

S.H. Cho et al. 2006. "Polydimethylsiloxane-Based Self-Healing Materials." Advanced Materials 18:997-1000.

B. Esser et al. 2005. Active self-healing wire insulation. Smart Structures and Materials 2005: Industrial and Commercial Applications of Smart Structues Technologies, edited by Edward V. White, Proceedings of SPIE pp. 8-16.

J.D. Rule et al. 2005. "Wax-Protected Catalyst Microspheres for Efficient Self-Healing Materials." Advanced Materials 17:205-208.

E.N. Brown et al. 2004. "Microcapsule induced toughening in a self-healing polymer composite." Journal of Materials Science 39:1703-1710.

M.R. Kessler et al. 2003. "Self-healing structural composite materials." Composites Part A 34:743-753.

S.R. White et al. 2001. "Autonomic healing of polymer composites." Nature 409:794-797.

M.R. Kessler et al. 2001. "Self-activated healing of delamination damage in woven composites." Composites Part A 32:683-699.

E. Brandon, Damage Detection and Self-Repair in Inflatable/Deployable Structures, NASA Tech Briefs, Mar. 2009, vol. 33, No. 3, p. 19.

* cited by examiner

BPADA - BISPHENOL A DIANHYDRIDE

PMA - PYROMELLITIC DIANHYDRIDE

BPDA - BIPHENYL DIANHYDRIDE

XTJ-542 (HUNTSMAN)
POLY(TETRAHYDROFURANE DIAMINE)

ODA - OXYDIANILINE

TDA - THIODIANILINE

DASO - DIANILINESULFONE

DABA - DIAMINOBENZANILIDE

MAA - MALEIC ANHYDRIDE

SUCCAN - SUCCINIC ANHYDRIDE

DAPS - DIAMINOPOLYSILOXANE

DAD - DIAMINODODECANE

IPDI - ISOPHORONE DIISOCYANATE

TDI - TOLUENE DIISOCYANATE

M - MELAMINE

PTT - PENTAERYTHRITOL TETRA-3 MERCAPTOPROPIONATE

METHYL BENZOATE

SELF-HEALING POLYMER MATERIALS FOR WIRE INSULATION, POLYIMIDES, FLAT SURFACES, AND INFLATABLE STRUCTURES

CROSS-REFERENCE TO RELATED APPLICATIONS

This application claims the benefit under 35 U.S.C. § 119(e) of U.S. Provisional Application Ser. No. 61/497,614, filed on Jun. 16, 2011, the contents of which are incorporated herein by reference.

STATEMENT OF GOVERNMENT INTEREST

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Electrical wires generally contain an inner metal conductor surrounded by an insulation material. The insulation becomes more brittle with age, and can crack or develop defects due to age, heat, exposure to strong electrical fields, and friction with other wires or surrounding objects or surfaces. Problems in electrical wiring systems are an important threat to the safety of spacecraft and aircraft, as well as other electrical devices. An electrical short in power bus wiring shortly after takeoff of Space Shuttle mission STS-93 resulted in loss of redundant main engine controller function. Arcing wire was blamed for the catastrophic losses of TWA Flight 800 and SwissAir Flight 111.

Polyimides are high performance polymers that have been used as wire insulation in demanding applications that have low tolerance for failure, such as space travel and aeronautics. The standard wire insulation for spacecraft and aircraft is polyimide, particularly KAPTON. Polyimides have excellent thermal stability and strength. Many hours are also expended in the repair and inspection of electrical wiring in an attempt to prevent wire failure.

Wire insulation with a built in self-healing capability would improve the safety of systems containing electrical wiring. Such insulation would require less inspection and repair time over the lifetime of the system.

All engineered materials eventually fail. They then must be replaced or repaired. A goal of this work is new self-healing materials that will repair themselves when they are damaged. An identified use for these new high performance self-healing materials is self-healing wire insulation. This would reduce the need for manual wire insulation repair and replacement and reduce the risk of failures, such as electrical shorts, that can result in loss of life.

A second area where self-healing would be desirable is inflatable structures, both terrestrial and space applications. Inflatable habitats are planned for use in space exploration. Inflatable habitats face risks of damage and puncture from micrometeroids and orbital debris externally, as well as potentially internally from movement of persons and equipment inside the structure. The ability to heal and seal an inflatable structure to prevent gas escape or to stop gas escape quickly after a puncture happens is a high priority. Of course, any material that could self heal in an inflatable barrier in space would also have uses in inflatable structures on earth, as well as in other types of structures.

New self-healing materials are needed for uses that include wire insulation, healing polyimides, especially aromatic polyimides, and healing inflatable structures to stop or prevent gas leakage.

SUMMARY OF THE INVENTION

One embodiment provides a polymer material comprising a low-melt polymer matrix that melts at a temperature below 300° C.; and a first set of microcapsules comprising an outer wall and an inner compartment, wherein the inner compartment comprises a volatile solvent that when released from the microcapsules melts or softens the polymer matrix.

One embodiment of the invention provides a polymer material comprising a low molecular weight polymer matrix and a first set of microcapsules comprising an outer wall and an inner compartment, wherein the inner compartment comprises a volatile solvent that when released from the microcapsules melts or softens the polymer matrix. In this way, damage to the material breaks open the microcapsules, releasing their solvent. The solvent melts or softens the surrounding polymer matrix allowing it to flow in the defect caused by the damage. The solvent then evaporates, leaving more solidified polymer in the defect that heals the defect.

Another embodiment provides a polymer material comprising a polymer matrix that flows at approximately 23° C., or about room temperature, wherein the polymer of the polymer matrix is formed by polymerization of monomers comprising: (a) a diamine monomer comprising repeating alkyleneoxy segments of 2 to 6 carbon atoms or repeating siloxy segments and having a molecular weight of between 250 and 3,000; and (b) a dianhydride monomer, wherein if the polymer material is cast as a film and the film is cut into two pieces, and the two pieces are placed laterally near to or in contact with each other, the pieces of the film flow back together at approximately 23° C., or about room temperature, within 30 days and molecularly combine.

By "molecularly combine" it is meant that the polymer molecules in the two pieces of material intermingle such that the cut is no longer visible over at least part of its length and the previously separated pieces do not pull apart as easily, i.e., have some tear resistance. In some cases, the material may have nearly the same tear resistance, or material strength, as before it was cut into two pieces.

Another embodiment provides a polymer material comprising a polymer matrix that flows at approximately 23° C., or about room temperature, wherein the polymer of the polymer matrix is formed by polymerization of monomers comprising: (a) a diamine or diol monomer comprising repeating alkyleneoxy segments of 2 to 6 carbon atoms or repeating siloxy segments and having a molecular weight of between 250 and 3,000; and (b) a diisocyanate monomer, wherein if the polymer material is cast as a film and the film is cut into two pieces, and the two pieces are placed laterally in contact with each other, the pieces of the film flow back together at approximately 23° C., or about room temperature, within 30 days and molecularly combine.

Another embodiment provides microcapsules comprising an outer wall and an inner compartment; wherein the outer wall is a polyimide, and the inner compartment comprises a poly(amic acid) (PAA); and wherein the polyimide is formed from the PAA. The microcapsules can be formed by a process comprising: forming an emulsion of an oil phase containing PAA in an aqueous phase; and adding an acid anhydride to the emulsion to imidize the PAA and form microcapsules, wherein the microcapsules have an outer shell of a polymide formed from the PAA and the acid anhydride, encasing a liquid PAA interior. PAA is highly compatible with polyimides, and is converted to polyimide by heating. So PAAs are desirable as a healing agent with polyimide. This method forms microcapsules with a PAA interior cargo, and a polyimide wall. The polyimide wall also is compatible with the polyimide matrix, so the microcapsules are evenly dispersed.

Another embodiment provides a self-healing polymer material comprising: (a) a polyimide matrix, wherein the polyimide has an excess of one reactive end group selected from the group consisting of amine and anhydride; and (b) microcapsules comprising a healing agent that is a monomer, prepolymer, or polymer, the healing agent having an excess of the other reactive end group not in excess in (a) selected from the group consisting of amine and anhydride. In this way, when the microcapsules break because of damage to the material, they release a monomer or prepolymer having one type of reactive end group which reacts with the compatible type of reactive end group that is found on the polymer matrix, to make new polyimide that fills and heals the damage.

Another embodiment provides a self-healing polymer film comprising: (a) a polyimide matrix; and (b) microcapsules dispersed in the polyimide matrix and having a wall and an inner compartment, the inner compartment comprising a solvent and a compatible low-melt polyimide.

Another embodiment provides a polymer material comprising: (a) a low-melt polyimide matrix; and (b) microcapsules having a wall and an inner compartment, wherein the inner compartment comprises: (i) a solvent that is released from the microcapsules when the microcapsules break, and melts or softens the low-melt polymer matrix at approximately 23° C., or about room temperature; or (ii) a healing agent selected from the group consisting of a reactive monomer, a prepolymer, a low-melt polymer, and combinations thereof; or (iii) both (i) and (ii).

Another embodiment provides a laminate composite structure comprising: two strong polymer film layers, each in contact with a flowable self-healing polymer film layer between the two strong polymer film layers; wherein the strong polymer film layers are mechanically stronger than the self-healing polymer film layer; wherein upon a break through the three polymer film layers, the self-healing polymer forms an air-tight seal in the composite structure; wherein the flowable self-healing polymer film layer is a polyimide, polyurea, polyurethane, polyamide, or polyester. In a more specific embodiment, the self-healing polymer film layer is a polyimide, polyurea, or polyurethane.

Another embodiment provides a fluid-containing object comprising: a wall comprising the laminate composite structure described above, wherein the laminate composite structure surrounds or holds a fluid.

Another embodiment provides a wire comprising: a central metal conductor surrounded by polymer insulation; wherein the polymer insulation comprises the laminate composite structure described above.

Another embodiment provides a polymer material comprising: (a) a polymer matrix; and embedded in the matrix, (b) microcapsules wherein the microcapsules are formed by a process comprising reacting an initial mixture of melamine, formaldehyde, and pentaerythritol tetra(3-mercaptopropionate) (PTT) to form a first batch of microcapsule shell wall prepolymer, and polymerizing the first batch of prepolymer to form a first microcapsule wall layer; and subsequently reacting a second batch of melamine, formaldehyde, and PTT to form a second batch of prepolymer and polymerizing the second batch of prepolymer to form a second microcapsule wall layer.

It was found that microcapsules can have their inner contents extracted when coming in contact with various solvents or can even directly leak their contents during the casting or manufacture of a polymer composite comprising microcapsules. Microcapsules formed with a double layer wall formed as described above, were found to have much lower leakage when they were cast into polymer films.

DETAILED DESCRIPTION OF THE INVENTION

Figure 1:
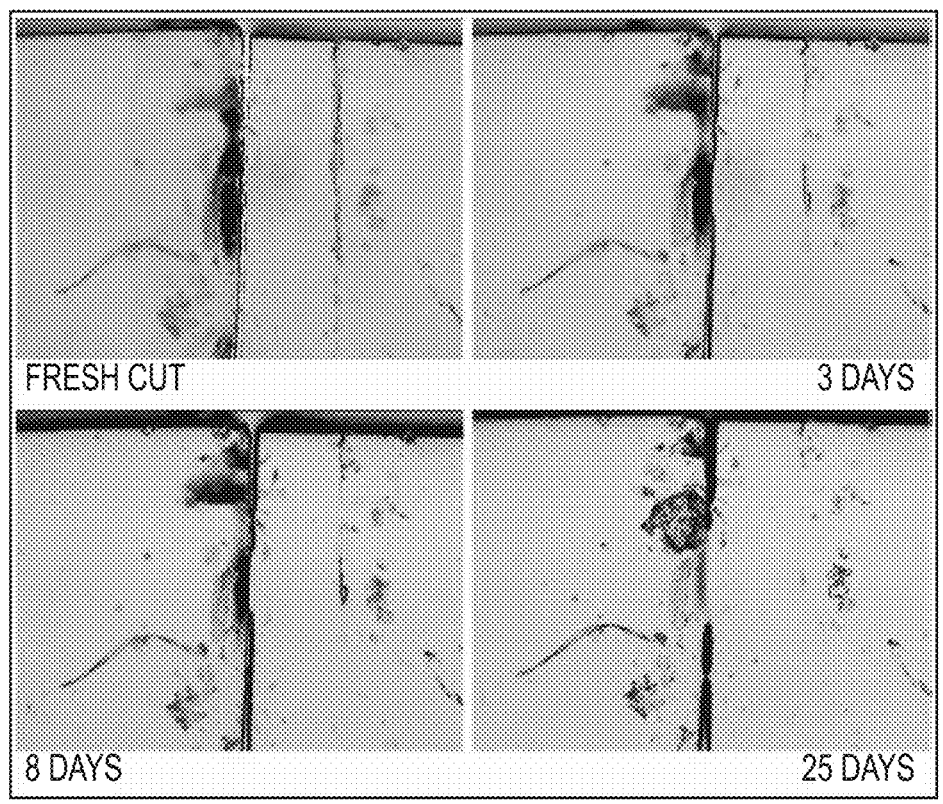
FIG. 1. Progression of photographs demonstrating the self-healing/sealing properties of polyimide BPADA/XTJ-542/ODA/MAA (9:7:3:2; Table 1, Item 2) Over Time. A thin film, roughly 10-mil thick, was placed on a glass slide and cut through with a razor blade. The initial cut was approximately 50 micrometers wide.
Figure 2:
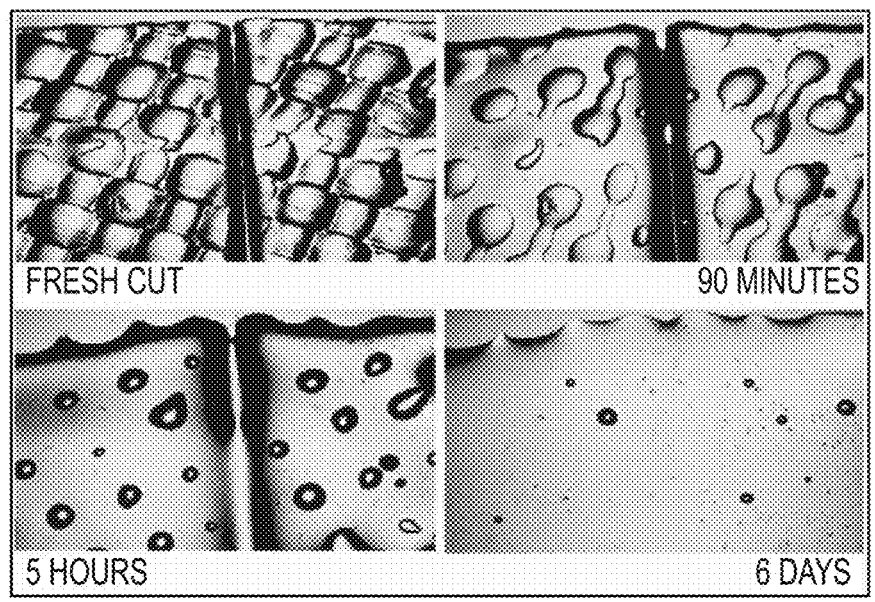
FIG. 2. Self-healing of polyimide BPADA/XTJ-542/ODA/C8Succan (9:7:3:2; Table 1, Item 6).
Figure 3:
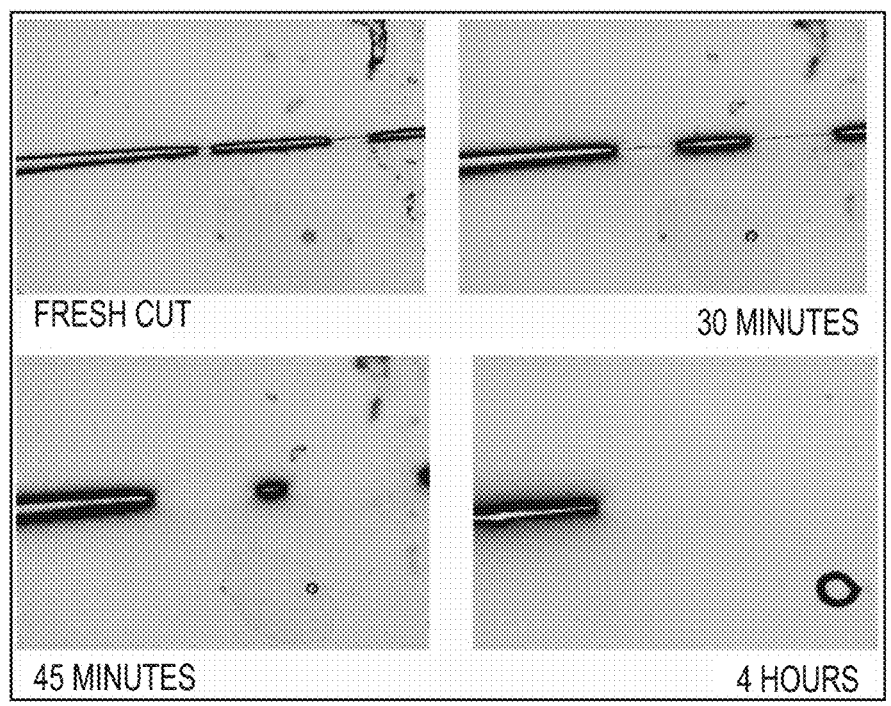
FIG. 3. Self-healing of polyimide BPADA/XTJ-542/ODA (4:3.5:1.5; Table 1, Item 5).
Figure 4:
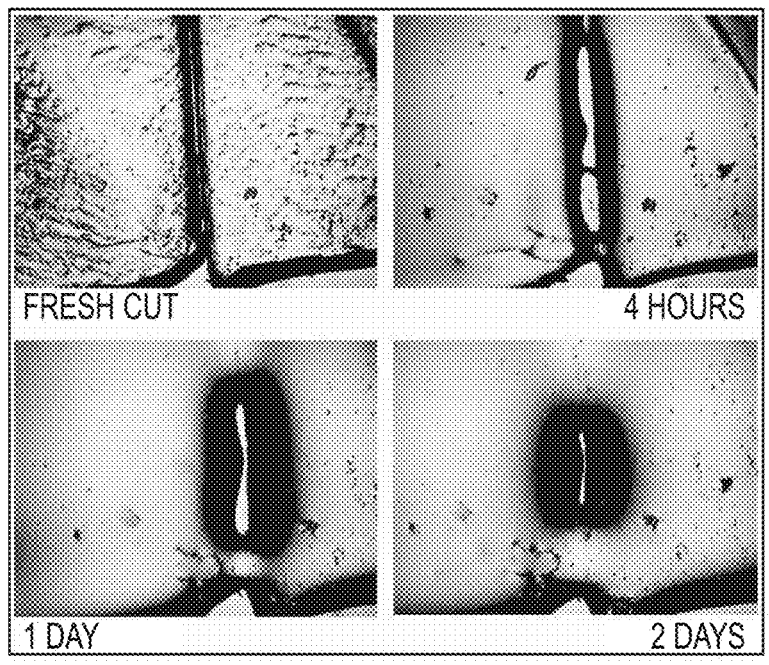
FIG. 4. Self-healing of polyimide BPADA/XTJ-542/TDA/Succan (9:7:3:2; Table 1, Item 17).
Figure 5:
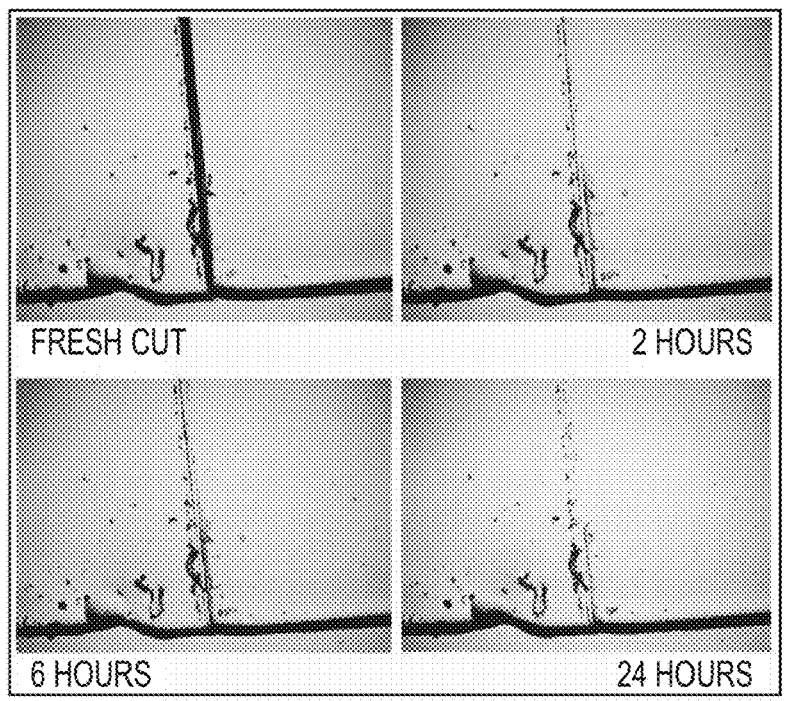
FIG. 5. Self-healing of polyurethane IPDI/Siloxane Diol (9:10; Table 1, Item 24).
Figure 6:
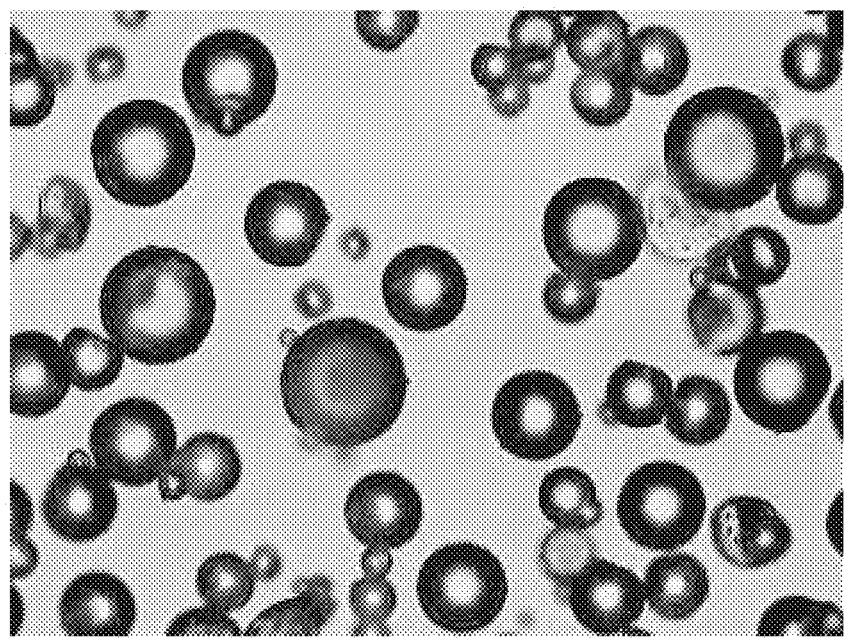
FIG. 6. Microcapsules (Table 2, Item 1) (400×).

The polyimide of polyimide wire insulation are of the formula below, where R together with R' or R" or both, form the polymer backbone. The polyimide of wire insulation is ordinarily an aromatic polyimide, i.e., a polyimide where R' and R" in the polyimide structure below are two carbon atoms of aromatic rings.

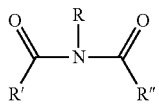

Poly(amic acid)s (PAAs) are of the form below, where R and either R' or R" or both together form the polymer backbone. With heating, the PAAs can imidize to the corresponding polyimide (PI), as shown below.

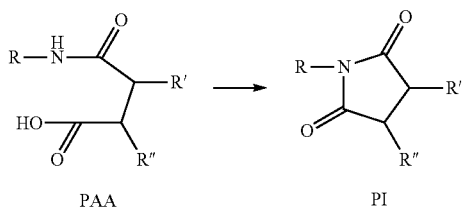

As used herein, an "aromatic" compound is a compound that has any aromatic structure, and an "aliphatic" compound is a compound that has no aromatic structure.

Low-Melt Polyimides for Self-Healing Films or Layers

One goal of this work is self-healing thin films, i.e., a polymer layer of 10 microns to 5 mm in thickness. More preferably the films are 50 microns to 5 mm, 50 microns to 3 mm, or 100 microns to 3 mm in thickness. Self-healing, high performance polymer materials that have excellent electrical, chemical, and thermal properties are especially desired. Polyimides, such as KAPTON, are common high performance polymers. They are used in wire insulation in aerospace and aviation, in military vehicles, and in other uses.

We have developed flowable polyimides that have a tendency, when cut, for the separated edges to slowly flow back together and form a seal again. We have found that microcapsules can be included in these materials to further assist the process. One type of microcapsule comprises a volatile solvent that, when released from the microcapsule, melts or softens the polymer matrix to fill in a void. Another type comprises a healing agent that can fill a defect in the polymer matrix or react with the polymer matrix to help heal the damage to the matrix.

Thus, one embodiment provides a polymer material comprising a low-melt polymer matrix; and a first set of microcapsules comprising an outer wall and an inner compartment, wherein the inner compartment comprises a volatile solvent that, when released from the microcapsules, melts or softens the polymer matrix.

The low-melt polymer matrix melts below 300° C., preferably below 250° C., more preferably below 200° C., more preferably below 150° C., and in some cases below 100° C.

In specific embodiments, the low-melt polymer matrix consists of polymer with an average molecular weight below 100,000, below 75,000, below 50,000, or below 25,000 Daltons.

In other embodiments, the polymer matrix may consist of a polymer with 2 to 1,000,000 repeat units.

Another embodiment provides a polymer material comprising a low-melt polymer matrix and a first set of microcapsules comprising an outer wall and an inner compartment, wherein the inner compartment comprises a healing agent selected from the group consisting of a monomer with reactive end groups, a prepolymer, and a polymer. The prepolymer and polymer may optionally also have reactive end groups. The polymer matrix may also optionally have reactive end groups.

In a preferred embodiment, the polymer matrix is, or comprises, a polyimide. Polyimides are typically formed by reaction of a dianhydride and a diamine. So the reactive end groups on the polymer matrix, the reactive monomer, and the prepolymer or polymer contained in the microcapsules may be an amine or anhydride. These two groups will react to form an amide bond and a PAA. The PAA may cyclize to convert the amide bond to an imide and form a polyimide.

In other embodiments the polymer matrix is a polyurethane, a polyamide, a polyester, or a polyurea.

There may be microcapsules with two types of reactive healing agents, one with amine groups and one with anhydrides. For instance, one type of microcapsule may have a diamine monomer and, another type in the same material, a dianhydride monomer. When both types of microcapsules break, the two monomers will react to form new polyimide, polyamide, or PAA to heal the damage.

In other types of materials, the material may contain one type of microcapsule with a monomer, prepolymer, or polymer with a first type of reactive end group, and a second type of microcapsule with monomer, prepolymer, or polymer with a second type of reactive end group, wherein the first and second types of reactive end groups will react with each other to form a covalent bond. In a preferred embodiment, the first reactive end group is an amine and the second is an anhydride, and the covalent bond is an amide or imide.

In other embodiments, the polymer matrix has an excess of a first type of reactive end group, and the microcapsules comprise a wall and an inner compartment, wherein the inner compartment comprises a monomer, prepolymer, or polymer with a second type of reactive end group, wherein the first and second types of reactive end groups will react with each other to form a covalent bond.

In a specific embodiment, the polymer material is an insulation layer of an electrical wire.

In a specific embodiment, the polymer matrix of the polymer material is a polyimide. In a more specific embodiment, it is an aromatic polyimide.

Low-melt polyimides can be prepared as described in U.S. Patent Application Publication US 2011/0212334 entitled "Low-Melt Poly(amic acids) and Polyimides and their Uses," published on Sep. 1, 2011, and U.S. Provisional Patent Application Ser. No. 61/658,058 entitled "Low-Melt Poly(amic acids) and Polyimides and Their Uses," filed on Jun. 11, 2012, the contents of both are incorporated herein by reference. They can be prepared, for instance, by polymerization of monomers comprising a diamine monomer comprising repeating alkyleneoxy segments of 2 to 6 carbon atoms or repeating siloxy segments and having a molecular weight of between 250 and 3,000. In a more specific embodiment, the diamine monomer has a molecular weight of between 500 and 1,600. The use of end caps that shorten the length of the polyimides, such as maleic anhydride, succinic anhydride, and other monoanhydrides or monoamines also yield low-melt polyimides, even without necessarily including diamine monomers comprising repeating alkyleneoxy segments of 2 to 6 carbon atoms or repeating siloxy segments and having a molecular weight of between 250 and 3,000.

In a specific embodiment of a polymer material comprising a low-melt polymer matrix, the material further comprises a set of microcapsules with an outer wall and an inner compartment, wherein the inner compartment comprises a flowable polymer. The flowable polymer may be a low-melt polymer. It may be the same polymer as the low-melt polymer matrix. Upon breakage of the microcapsules, the flowable polymer flows into any damaged areas of the material to heal the material. The flowable polymer may or may not have reactive end groups or otherwise react with the polymer matrix.

The set of microcapsules with a flowable polymer may be in addition to, or instead of, a set of microcapsules that comprises a volatile solvent that when released from the microcapsules melts or softens the polymer matrix.

In one embodiment of the polymer material comprising a low-melt polymer matrix and a first set of microcapsules having a volatile solvent that melts or softens the polymer matrix, the material further comprises a second set of microcapsules comprising an outer wall and an inner compartment, wherein the inner compartment comprises a prepolymer having reactive end groups.

In another embodiment, the material further comprises a third set of microcapsules comprising an outer wall and an inner compartment, wherein the inner compartment comprises a monomer having end groups that react with the reactive end groups of the prepolymer in the second set of microcapsules, wherein one of the prepolymer and the monomer reactive end groups is an anhydride and the other is an amine.

In one embodiment of the polymer material comprising a low-melt polymer matrix and a first set of microcapsules having a volatile solvent that melts or softens the polymer matrix, the inner compartment of the first set of microcapsules further comprises a microcapsule polymer dissolved in the solvent, wherein when the solvent dissolves or softens the polymer matrix after microcapsule breakage, the microcapsule polymer heals damage to the polymer matrix.

When the capsules with a solvent or a healing agent release their contents, the released material allows the healing process to occur faster and cover a larger surface area. If a solvent is included, it must possess the ability to either dissolve, at least to some extent, or plasticize the polymer matrix. It must also be volatile enough to evaporate from the healed area but have a boiling point high enough to remain in the polymer matrix or film long enough for it to cause the desired increase in flow. As a general guideline, the boiling point should be between about 125° C. and 250° C. for a desirable solvent. The solvent can also contain a low level of polymer dissolved therein, which can remain behind and help seal or heal the damage upon evaporation of the solvent.

The self-healing characteristics can be enhanced by the design or construction of the film or layer for wiring applications. Laboratory proof of concept demonstrations indicate that the flowable properties can be maximized if significant tension is not placed upon the layer. Thus, a sleeve should work better than a tightly wrapped overlayer. It was observed that a film wrapped around the longitudinally along a wire has less tension than a film wrapped in a lateral swirl around the wire, and thereby allows for better self-sealing to occur.

The self-sealing properties of a low-melt polyimide matrix with microcapsules containing a volatile solvent, methyl benzoate, were tested on various surfaces. It was most successful in sealing after the film was cut on glass, KAPTON, and copper-coated tape. It was less successful on nickel-coated carbon fiber, OASIS tape, and TEFLON.

Another embodiment provides a polymer material comprising: (a) a low-melt polyimide matrix; and (b) microcapsules having a wall and an inner compartment, wherein the inner compartment comprises: (i) a solvent that is released from the microcapsules when the microcapsules break, and melts or softens the low-melt polymer matrix at or about room temperature; or (ii) a healing agent selected from the group consisting of a reactive monomer, a prepolymer, a low-melt polymer, and combinations thereof; or (iii) both (i) and (ii). By the term "melts or softens" we mean that the release of the solvent causes some measurable and useful increase in flow of the polymer matrix locally at the site of solvent release. This may be by partially dissolving the polymer matrix.

In a more specific embodiment, the polymer material comprises at least two types of microcapsules: a first type comprising a healing agent with a first type of reactive end group, and a second type comprising a healing agent with a second type of reactive end group; wherein when released from the microcapsules the first type of healing agent reacts with the second type of healing agent to form a polymer that heals defects in the polymer material.

The present invention relates in part to the preparation of PAAs or polyimides with significantly lower melting/softening temperatures. One way the inventors have found to achieve that is by mixing two or more PAAs or polyimides together. Due to melting point depression, the melting temperature of the resulting mixture is significantly lower than the melting point of the polymer component with the highest melting temperature, and often lower than the melting temperature of both polymer components or all polymer components of the mixture.

Typically, the polymer mixture is prepared as detailed hereafter. The two PAAs or polyimides chosen as components in the mixture are blended by mixing individual fluids containing the component PAAs or polyimides or by mixing the individual solid PAAs or polyimides with a given amount of suitable solvent such as N-methyprrolidinone (NMP). The newly created mixture is stirred at room temperature until the entire polymer has dissolved. This polymer solution can then be used to cast polymer films or to be processed to isolate the solid polymer mixture. A polyimide mixture can be prepared by first preparing a mixture of PAAs as described here, and then heating the PAA mixture to cyclize the PAAs into polyimides.

High performance polyimide polymers used today in applications such as electrical wire insulation are prepared from aromatic monomer starting materials. Polyimides prepared from aliphatic monomers do not possess the same degree of excellent electrical, chemical, and thermal properties as their aromatic counterparts. Many PAA precursors prepared from aliphatic monomers do have, however, melting points far lower than those prepared from aromatic monomers. Thus, PAAs with sufficiently low melting points, that still polymerize to a polyimide with good physical properties for insulation—strength, flexibility, resistance to abrasion, and high or no melting temperature—can be produced in at least two ways: by mixing two or more PAAs and thereby producing a mixture that has a lower melting temperature than at least one of the PAAs, or by incorporating an appropriate blend of aliphatic and aromatic monomers in making a single PAA backbone. Increased aliphalicity of the monomers and the PAA gives the PAA a lower melting temperature. Low-melting polyimides can be prepared also by incorporating aliphalicity into the polyimides or generating a mixture of polyimides that has a lower melting point than either or both polyimides of the mixture.

A typical PAA of the invention that combines an appropriate blend of aliphatic and aromatic monomers in a single backbone is prepared in the following manner. An aromatic diamine (or mixture of aliphatic and aromatic diamines) is dissolved into a suitable solvent such as NMP. The mixture is held at room temperature and is stirred under nitrogen. An aromatic dianhydride (or mixture of aliphatic and aromatic dianhydride) is slowly added to the diamine mixture. An exothermic reaction ensues which is minimized by the slow monomer addition and/or cooling. After the dianhydride has all been added, the mixture is stirred for a number of hours to complete the polymerization. The newly created polymer solution can then be cast into polymer films or processed to isolate the solid polymer. The PAA can be heated to cyclize it and convert it to a low-melt polyimide suitable for use in self-healing.

In another embodiment, the inventors have found that polyimides containing either siloxane or polyether chemistry are effective low-melt polymers for self-healing. PAAs having siloxane or polyether chemistry also have the same advantages.

Many physical properties have to be met in order for a polyimide to be useful for self-healing. Two desirable properties are flexibility and a low melting point. It has been determined that films with increased flexibility can be obtained through the incorporation of polyether moieties or through the use of silicon in the form of siloxane chemistry as part of the backbone of PAAs and polyimides. Some of the films comprising the present invention have final polyimides that are also flexible and have relatively low melting points. It has been determined that these flexible polyimide films are adaptable for use as repair materials and are flowable for self-healing.

A typical polyimide is prepared by reacting equal molar amounts of two starting materials (i.e., a dianhydride and a diamine). These molecules react alternately with one another when mixed until a polymer with a molecular weight of several hundred thousand is produced. Such a polymer, by itself, is often too high in molecular weight to melt or function well for self-healing. Average molecular weights of below 50,000, preferably below 20,000 are needed for a resin to exhibit the needed melt and flow properties necessary for self-healing. End cap molecules such as maleic anhydride can function as chain termination molecules and produce resins that will form good films. With heating, the polymers with maleic anhdyride end caps cross-link through the olefinic group of maleic anhydride to produce a higher molecular weight polymer.

Other end-cap groups that also have olefinic nature can be substituted for maleic acid, including allyl alcohol, vinyl amine, allyl amine, acrylic acid, methacrylic acid, and the like.

In specific embodiments, the low-melt polymer comprises a polyimide with reactive end groups; wherein at the second temperature, the polyimide with reactive end groups reacts through its reactive end groups to form a repair polyimide. The end groups may also react with the polymer substrate so the repair polyimide is covalently bonded to the polymer substrate. The reactive end groups in specific embodiments are olefinic groups. In specific embodiments, the reactive end groups are olefinic organic acid end caps, for example maleic acid end caps resulting from reacting with maleic anhydride. In specific embodiments, the reactive end groups are groups resulting from end-capping reactions with acrylic acid (forming an acrylic acid salt with amino or other positively charged groups on the polymer), methacrylic acid, allyl alcohol, allyl amine, vinyl amine, and maleic or itaconic anhydride.

In other embodiments, the reactive end groups have free amine or anhydride groups.

In specific embodiments of the methods and materials and articles disclosed herein, the low-melt polymer or low-melt polymer layer comprises a mixture of at least two PAAs or at least two polyimides.

In specific embodiments, the mixture of two PAAs or at least two polyimides melts at a lower temperature than at least two of the at least two PAAs or polyimides.

In particular embodiments, the low-melt polymer comprises a PAA or a polyimide having reactive end groups, or a polyimide comprising polyether blocks or polysiloxane blocks in the polymer backbone.

The PAA in specific embodiments also has reactive end groups.

In specific embodiments, the PAA comprises polyether or polysiloxane blocks.

Where the PAA or polyimide comprises polyether blocks, the polyether blocks in specific embodiments have the structure —$(C_2-C_6)$alkyl-[O—$(C_2-C_6)$alkyl-$]_n$O—$(C_2-C_6)$alkyl-. In other embodiments, the polyether blocks have the structure —$(C_4-C_6)$alkyl-[O—$(C_4-C_6)$alkyl-$]_n$O—$(C_4-C_6)$alkyl-. In specific embodiments, the polymer is formed by reacting a diamine and a dianhydride, where the diamine has the structure $H_2N$—$(C_2-C_6)$alkyl-[O—$(C_2-C_6)$alkyl-$]_n$O—$(C_2-C_6)$alkyl-$NH_2$. In other embodiments, the diamine has the structure $H_2N$—$(C_4-C_6)$alkyl-[O—$(C_4-C_6)$alkyl-$]_n$O—$(C_4-C_6)$alkyl-$NH_2$.

Where the PAA or polyimide contains polysiloxane blocks, the polysiloxane blocks in specific embodiments have the structure —$(C_2-C_6)$alkyl-O—$Si(CH_3)_2$—[O—Si$(CH_3)_2$-$]_n$O—Si$(CH_3)_2$—O—$(C_2-C_6)$alkyl-. In specific embodiments, the polymer is formed by reacting a diamine and a dianhydride, where the diamine has the structure $H_2N$—$(C_2-C_6)$alkyl-O—$Si(CH_3)_2$—[O—Si$(CH_3)_2$-$]_n$O—Si$(CH_3)_2$—O—$(C_2-C_6)$alkyl-$NH_2$.

In specific embodiments, 15% to 60% of the carbon atoms of the low-melt polymer are in polyether or polysiloxane blocks.

In specific embodiments, the PAA mixture is formed by a process comprising: dissolving the at least two PAAs into a compatible solvent to form a PAA solution; and evaporating at least some of the solvent to form a solidified PAA mixture.

In specific embodiments, the polyimide mixture is formed by a process comprising: dissolving the at least two polyimides into a compatible solvent to form a polyimide solution; and evaporating at least some of the solvent to form a solidified polyimide mixture.

In specific embodiments, the low-melt polymer is formed from a reaction mixture of monomers, wherein at least 15% by weight of the monomers are fully aliphatic, defined herein as not aromatic.

In specific embodiments, at least 15% of carbon atoms in the low-melt polymer are aliphatic carbon atoms (defined herein as not being a ring carbon of an aromatic ring). In other specific embodiments, 15% to 60% of carbon atoms in the low-melt polymer are aliphatic.

In specific embodiments, the low-melt polymer has a melting temperature of 70° C. to 170° C. In other embodiments, the low-melt polymer has a melting temperature of 70° C. to 150° C. In specific embodiments, the low-melt polymer has a melting temperature of 70° C. to 200° C., 70° C. to 250° C., or 70° C. to 300° C.

In specific embodiments, the low-melt polymer layer comprises a cross-linker. In specific embodiments, the cross-linker is a residue of acrylic acid, methacrylic acid, allyl alcohol, allyl amine, vinyl amine, or maleic anhydride.

In specific embodiments of the low-melt polymers having reactive end groups, the reactive end groups are selected from the group consisting of anhydrides, carboxylic acids, esters, amines, alcohols, isocyanates, epoxides, olefins, and dienes.

In specific embodiments of low-melt polymers with reactive end cap groups, the reactive end cap groups may be olefinic end cap groups. In more specific embodiments, they are olefinic organic acid end cap groups, e.g., maleic acid groups produced by reaction of maleic anhydride.

In specific embodiments, the low-melt polymer comprises olefinic organic acid end caps formed by including an acid anhydride comprising an olefin group in a polymerization reaction to form the low-melt polyimide or PAA.

In specific embodiments of the methods, materials, and apparatuses disclosed herein, the low-melt polymer has an average molecular weight below 50,000, more preferably below 20,000.

One embodiment of the invention provides a method of forming a PAA or a polyimide comprising: reacting a dianhydride and a diamine in a polymerization reaction mixture to form a PAA; wherein the dianhydride is a dianhydride of formula 1,

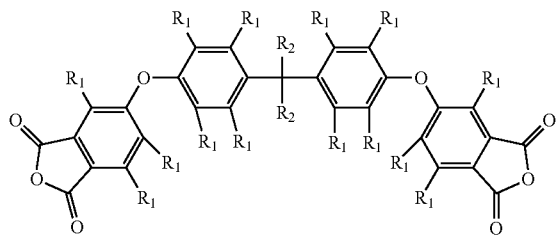

wherein each $R_1$ is independently H or $(C_1-C_4)$alkyl, and each $R_2$ is independently H or $(C_1-C_4)$alkyl;

or wherein the diamine is a diamine of formula 2 or 3

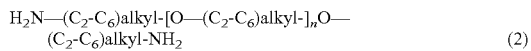

(2)

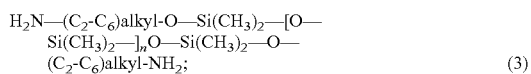

(3)

wherein at least 50% by weight of reactants in the polymerization reaction mixture are a compound of formula 1, 2, or 3 or a combination thereof.

The PAA may be heated to convert it to a polyimide.

In a specific embodiment, the compound of formula 1 is bisphenol A dianhydride (BPADA), where each of the $R_1$'s is hydrogen and each of the $R_2$'s is methyl (see Example 1 below).

In a specific embodiment, the compound of formula 2 is XTJ-542 (see Example 1 below).

In a specific embodiment, the compound of formula 3 is diaminopolysiloxane (DAPS) (see Example 1 below).

In a preferred embodiment, the dianhydride is a compound of formula 1 and the diamine is a diamine of formula 2 or 3.

In specific embodiments, at least 60%, at least 70%, or at least 80% of reactants in the polymerization reaction mixture are a compound of formula 1, 2, or 3, or a combination thereof.

Low-Melt Polyureas and Polyurethanes

In another embodiment, the inventors have found that polyureas and polyurethanes containing either siloxane or polyether chemistry are effective low-melt polymers for self-healing, similarly to the polyimides described herein.

A typical polyurea and polyurethane is prepared by reacting equal molar amounts of two starting materials (i.e., a diisocyanate and a diamine or diol).

In specific embodiments, the low-melt polymer comprises a polyurea or polyurethane with reactive end groups.

In specific embodiments, the reactive end groups are free amine, alcohol, or isocyanate groups.

In specific embodiments of the methods, materials, and articles disclosed herein, the low-melt polymer or low-melt polymer layer comprises a mixture of at least two polymers, wherein the at least two polymers include one or more polyureas or polyurethanes.

In specific embodiments, the mixture of two polymers melts at a lower temperature than at least two of the at least two polymers.

In particular embodiments, the low-melt polymer comprises a polyurea having reactive end groups or a polyurethane having reactive end groups.

In specific embodiments, the low-melt polymer comprises a polyurea or polyurethane, wherein the polyurea or polyurethane comprises polyether blocks or polysiloxane blocks in the polymer backbone.

Where the low-melt polymer comprises polyether blocks, the polyether blocks in specific embodiments have the structure $-(C_2-C_6)$alkyl-$[O-(C_2-C_6)$alkyl-$]_nO-(C_2-C_6)$alkyl-. In other embodiments, the polyether blocks have the structure $-(C_4-C_6)$alkyl-$[O-(C_4-C_6)$alkyl-$]_nO-(C_4-C_6)$alkyl-. In specific embodiments, the polymer is formed by reacting a diamine and a diisocyanate, where the diamine has the structure $H_2N-(C_2-C_6)$alkyl-$[O-(C_2-C_6)$alkyl-$]_nO-(C_2-C_6)$alkyl-$NH_2$. In other embodiments, the diamine has the structure $H_2N-(C_4-C_6)$alkyl-$[O-(C_4-C_6)$alkyl-$]_nO-(C_4-C_6)$alkyl-$NH_2$.

In specific embodiments, the polymer is formed by reacting a diol and a diisocyanate, where the diol has the structure $HO-(C_2-C_6)$alkyl-$[O-(C_2-C_6)$alkyl-$]_nO-(C_2-C_6)$alkyl-$OH$. In other embodiments, the diol has the structure $HO-(C_4-C_6)$alkyl-$[O-(C_4-C_6)$alkyl-$]_nO-(C_4-C_6)$alkyl-$OH$.

Where the low-melt polymer contains polysiloxane blocks, the polysiloxane blocks in specific embodiments have the structure $-(C_2-C_6)$alkyl-$O-Si(CH_3)_2-[O-Si(CH_3)_2-]_nO-Si(CH_3)_2-O-(C_2-C_6)$alkyl-. In specific embodiments, the polymer is formed by reacting a diamine and a diisocyanate, where the diamine has the structure $H_2N-(C_2-C_6)$alkyl-$O-Si(CH_3)_2-[O-Si(CH_3)_2-]_nO-Si(CH_3)_2-O-(C_2-C_6)$alkyl-$NH_2$.

In specific embodiments, the low-melt polymer is formed by reacting a diol and a diisocyanate, where the diol has the structure $HO-(C_2-C_6)$alkyl-$O-Si(CH_3)_2-[O-Si(CH_3)_2-]_nO-Si(CH_3)_2-O-(C_2-C_6)$alkyl-$OH$.

In specific embodiments, 15% to 60% of the carbon atoms of the low-melt polymer are in polyether or polysiloxane blocks.

One embodiment of the invention provides a method of forming a polyurea or polyurethane comprising: reacting (a) a diisocyanate and (b) a diamine or diol in a polymerization reaction mixture to form a low-melt polyurea or polyurethane; wherein the diisocyanate is an aliphatic diisocyanate, for instance isophorone diisocyanate (IPDI); and wherein the diamine is a diamine of formula 2 or 3

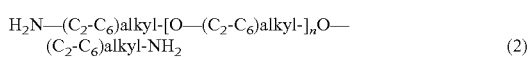

(2)

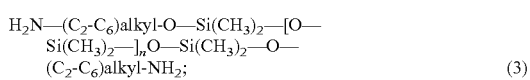

(3)

and wherein the diol is a diol of formula 4 or 5

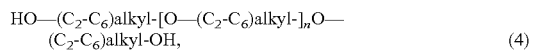

(4)

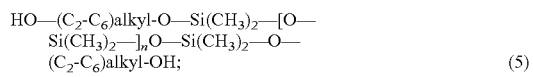

(5)

wherein at least 40% by weight of reactants in the polymerization reaction mixture are a compound of formula 2, 3, 4, or 5, or a combination thereof.

In a specific embodiment, the compound of formula 2 is XTJ-542.

In a specific embodiment, the compound of formula 3 is diaminopolysiloxane (DAPS).

In a specific embodiment, the compound of formula 5 is siloxane diol.

Materials Development—Self-Healing Films

Another embodiment provides a polymer material comprising a polymer matrix that flows at or about room temperature, wherein the polymer of the polymer matrix is formed by polymerization of (a) a diamine monomer comprising repeating alkyleneoxy segments of 2 to 6 carbon atoms or repeating siloxy segments and having a molecular weight of between 250 and 3,000; and (b) a dianhydride monomer, wherein if the polymer material is cast as a film and the film is cut into two pieces, and the two pieces are placed in close proximity to each other, the pieces of the film flow back together at or about room temperature within 30 days and molecularly combine.

By "close proximity" it is meant that the polymer edges are within 100 microns of each other.

By "molecularly combine" it is meant that the polymer molecules in the two pieces of materials intermingle such that the cut is no longer visible over at least part of its length and the previously separated pieces do not pull apart as easily, i.e., have some tear resistance. In some cases the material may have nearly the same tear resistance, or material strength, as before it was cut into two pieces.

A number of polymer compositions that we have investigated have exhibited self-healing properties. One such material is prepared from the following components: BPADA, XTJ-542, ODA, and MAA at a mole ratio of 9:7:3:2 (Item 2 of Table 1) (refer to FIG. 14 for chemical component definitions and to Table 1 for ratios).

This material, when cast as a film and heated to 150° C., imidizes and produces a thin film with highly elastic properties. It is also somewhat tacky and bonds to itself at the slightest touch. FIG. 1 demonstrates the self-healing properties by showing the closure of a cut in a 10 mil thick film roughly over several days time.

In view of these self-healing/sealing properties of Item 2 of Table 1, a number of other materials were prepared and evaluated; some were within the polyimide family and others were in the polyurea and polyurethane groups. Although Item 2 of Table 1 exhibited both self-healing behavior along with significant film-like structure, it was desired that several physical properties of this film be improved, if possible. A more desirable film would have a faster rate of self-healing along with improved tensile strength. Table 1 lists the sample identification formulations, and the physical properties of the polymers produced in an effort to obtain these improved properties. Formulations with equivalent composition are shown in the comments section of Table 1.

TABLE 1

Polymer Chemical Compositions Evaluated for Self-healing Properties.

| Item | Sample Identification STJ# | Chemical Components (Appendix A) | Ratio (m) | Comments, Film Properties |
|---|---|---|---|---|
| 1 | 11-69 | BPADA/DAPS/ODA/MAA | 9:8:2:2 | Siloxane Polyimide Flexible (SPIF) |
| 2 | 11-44 | BPADA/XTJ-542/ODA/MAA | 9:7:3:2 | Also 11-56, 86 & 95; NMP solvent |
| 3 | 11-77 | BPADA/XTJ-542/ODA/MAA | 9:7:3:2 | Also 11-71; dimethyl formamide solvent (DMF) solvent |
| 4 | 11-57 | BPADA/XTJ-542/ODA | 10:7:3 | No End caps, slow self-healing |
| 5 | 11-58 | BPADA/XTJ-542/ODA | 4:3.5:1.5 | Partial Na Salt, ionomer |
| 6 | 11-59 | BPADA/XTJ-542/ODA/C8Succan | 9:7:3:2 | Alternate end caps, self-healing |
| 7 | 11-60 | BPADA/XTJ-542/DAD | 9:6:4 | 11-44, 77 like; self-healing |
| 8 | 11-80 | BPADA/XTJ-542/ODA/MAA | 9:7:3:1 | Half of reactive endcaps, self-healing |
| 9 | 11-88 | BPADA/XTJ-542/ODA/MAA/Succan | 9:7:3:1:1 | Half reactive-half unreactive, self-healing |
| 10 | 11-92 | BPADA/XTJ-542/ODA/Succan | 9:6.5:3.5:2 | Same properties as item 3 |
| 11 | 17-2 | PMA/XTJ-542/ODA/MAA | 9:7:3:2 | Paste-like polyimide liquid |
| 12 | 17-6 | PMA/XTJ-542/ODA/MAA | 9:6:4:2 | Paste-like polyimide liquid |
| 13 | 17-9 | PMA/XTJ-542/ODA/MAA | 18:13:6:23 | Paste-like polyimide liquid |
| 14 | 17-11 | PMA/XTJ-542/ODA/Succan | 9:5:5:2 | Paste-like polyimide liquid |
| 15 | 17-12 | BPDA/XTJ-542/ODA/Succan | 9:7:3:2 | Paste-like polyimide liquid |
| 16 | 17-15 | BPDA/XTJ-542/ODA/Succan | 9:4:6:2 | Hazy, weak film, no self-healing |
| 17 | 17-17 | BPADA/XTJ-542/TDA/Succan | 9:7:3:2 | Similar to #3, (11-77) |
| 18 | 17-18 | BPADA/XTJ-542/DASO/Succan | 9:7:3:2 | Slightly less self-healing than #17 |
| 19 | 17-19 | BPADA/XTJ-542/DABA/Succan | 9:7:3:2 | Weak film, no self-healing |
| 20 | 11-72 | TDI/XTJ-542 | 9:10 | Polyurea - Fragile, no flow |
| 21 | 11-74 | TDI/DAPS | 9:10 | Polyurea - Tougher, no flow |
| 22 | 11-75 | IPDI/XTJ-542 | 9:10 | Polyurea - self sealing |
| 23 | 11-83 | IPDI/DAPS | 9:10 | Polyurea - Slightly Self sealing |

TABLE 1-continued

Polymer Chemical Compositions Evaluated for Self-healing Properties.

| Item | Sample Identification STJ# | Chemical Components (Appendix A) | Ratio (m) | Comments, Film Properties |
|---|---|---|---|---|
| 24 | 11-84 | IPDI/Siloxane Diol | 9:10 | Polyurethane; self sealing |
| 25 | 11-89, 94 | IPDI/Terethane 1000 | 9:10 & 1:1 | Polyurethane; liquid |
| 26 | 11-78 | BPADA/DAPS | 1:1 | Low viscosity liquid |

Polymer chemical compositions, Items 1-19 in Table 1 began as PAAs dissolved in a solvent. With the exception of Item 5, all were evaluated as films which were cast onto a substrate and then baked at either 150° C. or 200° C. for 60-90 minutes (baking removes the solvent and converts the PAA into a polyimide). A number of interesting facts were observed between the building blocks used in these polymers and the degree of flowable or self-healing properties they have in final cast films. The most important factor necessary to obtain a self-healing polymer is the inclusion of a long flexible monomer such as a polyether diamine (e.g., XTJ-542) or polysiloxane diamine (e.g., DAPS). The use of BPADA dianhydride also appears important in producing a polyimide-type polymer which can be crafted into a film having some structure, while also having the ability to flow and seal small cuts or punctures. Several other dianhydrides evaluated using these flexible diamines produced polymers which had no structural integrity. Polymers listed in items 11-16 of Table 1 all had no, or very poor, film producing ability.

Each of these polyimides in Table 1 also had, in its formula, a second diamine co-monomer. In all cases except one (Item 7) this co-monomer is an aromatic diamine. Only one diamine co-monomer in this group produced a film with no self-healing properties (Table 1, Item 19). The inclusion of the aromatic diamine appears important in obtaining an increase in tensile strength and thermal stability of the final product. A number of these polyimide polymers were initially prepared with maleic anhydride end capping groups. These maleic anhydride end caps are desirable in formulations which are employed as primary wire insulation matrices. In self-healing formulations with BPADA, XTJ-542, ODA, and MAA (such as Table 1, Items 2 and 3), the presence of these end caps is very noticeable when the polymer is heated to the 150° C. imidization temperature and above. Crosslinking of the polymer chains via thermal polymerization of the end cap groups imparts a "memory" to the polymer. This is similar to what is observed in polymers such as vulcanized natural rubber which can be stretched with the material returning to or near its original shape rather than remaining in its earlier stretched length. The use of succinic anhydride as an end-capping group eliminates this phenomenon. The use of end caps aids in the preparation of a lower molecular weight polymer which facilitates faster self-healing.

Formulation Items 20-25 involve the use of isocyanate reaction chemistry resulting in low molecular weight polyureas and urethanes. The use of flexible diamine monomers resulted in several materials which exhibit good self-healing properties (Table 1, Items 22-24). These polymers also have similar tackiness and flexibility with poor tensile strength as is seen with the self-healing polyimides.

FIGS. 2-5 show the self-healing properties of selected polymer chemical compositions from Table 1 (all cuts were made similar to the polymer cut described in FIG. 1). Ridges observed in the first picture on the left of FIG. 2 were transferred from the pad used to press the film; the flowable/sealable properties of the film are observed as the cut and ridges disappear over time.

Thus, again, one embodiment provides a polymer material comprising a polymer matrix that flows at or about room temperature, wherein the polymer of the polymer matrix is formed by polymerization of (a) a diamine monomer comprising repeating alkyleneoxy segments of 2 to 6 carbon atoms or repeating siloxy segments and having a molecular weight of between 250 and 3,000, and (b) a dianhydride monomer, wherein if the polymer material is cast as a film and the film is cut into two pieces, and the two pieces are placed in close proximity to each other, the pieces of the film flow back together at or about room temperature within 30 days and molecularly combine. Here the polymers are polyimides.

Another embodiment provides a polymer material comprising a polymer matrix that flows at approximately 23° C., or about room temperature, wherein the polymer of the polymer matrix is formed by polymerization of monomers comprising (a) a diamine or diol monomer comprising repeating alkyleneoxy segments of 2 to 6 carbon atoms or repeating siloxy segments, and having a molecular weight of between 250 and 3,000; and (b) a diisocyanate monomer, wherein if the polymer material is cast as a film and the film is cut into two pieces, and the two pieces are placed laterally in contact with each other, the pieces of the film flow back together at or about room temperature within 30 days and molecularly combine. Here the polymers are polyureas or polyurethanes.

In a specific embodiment of the flowable polyureas and polyurethanes, the diisocyanate monomer is an aliphatic diisocyanate (e.g., IPDI).

In a specific embodiment, the diamine or diol monomer is DAPS or siloxane diol.

In a specific embodiment of the flowable polyimides, polyurethanes, and polyureas, the polymer material is a film or layer 50 microns to 5 mm thick, or 100 microns to 3 mm thick.

In specific embodiments, a film of the polymer material 250 microns thick (10 mils) when cut with a razor blade, visually flows back together and molecularly combines over more than 50% of the cut length within 24 hours at or about room temperature.

The diamine monomers that were successfully tested in generating these properties were XTJ-542 and DAPS. The dianyhdride tested was BPADA, an aromatic dianhydride.

In specific embodiments, the dianhydride is an aromatic dianhydride. In a more specific embodiment, it is BPADA. In other embodiments it is BPDA or benzophenone-3,3',4,4'-tetracarboxylic dianhydride.

In specific embodiments, the monomers further comprise an aromatic diamine monomer (e.g., ODA, DASO, or TDA).

In specific embodiments, the monomers further comprise an end capping group (e.g., MAA or Succan). MAA is cross-linkable through its carbon-carbon double bond. Succan does not have that double bond and is not cross-linkable. As discussed above, the cross-linking of the polymer chains via thermal polymerization of the end caps gives the material a memory, like vulcanized rubber. But after cross-linking it also increases the molecular weight of the polymer material and makes it less flowable.

Thus, in specific embodiments, the end capping group is not cross-linkable. In other embodiments it is. Either may be desirable for different properties.

Microcapsules Containing PAAs

Another technique employed here for self-healing is to encapsulate a healing agent in microcapsules and incorporate them into a polymer matrix, wherein the microcapsules contain the healing agent. Aerospace wiring is one system that would benefit from this. Older aerospace wire typically utilizes a polyimide as the core insulation. Cracking and breakdown of the polyimide material can cause electrical anomalies and wire shorts.

To accomplish self healing in polyimide-type wire insulation, it would be desirable to have microcapsules that contain a polyimide or PAA (which is a precursor to polyimides). But some PAAs and polyimides have limited solubility in solvents, making them difficult to encapsulate. The solvents they are most soluble in are aprotic polar solvents that are miscible with water and many other solvents.

Microcapsules containing PAA liquid interior encased in a polyimide shell can, however, be created. One way to do this is to make a solution of PAA in a water-immiscible solvent such as methylbenzoate. The solution is then poured into water or an aqueous solution with stirring. This creates droplets of PAA/solvent in the water. Acetic anhydride or another anhydride or imidization reagent can be added to the water, or in some cases may be pre-dissolved in the water before adding the PAA/solvent solution. The imidization reagent causes imidization of the PAA at the droplet interface, converting it to a polyimide on the droplet interface as the imidization reagent contacts the surface of the droplets. As most polyimides are less soluble in solvents than PAAs the polyimide formed on the surface of the droplet will not dissolve in the solvent/PAA mixture but will remain as a solid shell at the water/droplet interface. This process creates microcapsules with a polyimide shell encasing a liquid PAA or liquid PAA/solvent interior.

An advantage of these microcapsules is that the polyimide wall is highly compatible with a polyimide matrix, since they are similar or the same material, and thus the microcapsules are easy to evenly disperse in a polyimide matrix.

Thus, one embodiment provides microcapsules comprising an outer wall and an inner compartment; wherein the outer wall is a polyimide, and the inner compartment comprises a PAA; and wherein the polyimide is formed from the PAA.

In a more specific embodiment, the microcapsules are formed by a process comprising: forming an emulsion of PAA droplets in an aqueous phase; and reacting an imidization reagent in the aqueous phase with PAA in the droplets to form a polyimide and form microcapsules; wherein the microcapsules have an outer shell of a polymide formed from the PAA, encasing a liquid PAA interior.

The imidization reagent in specific embodiments can be an acid anhydride or, more specifically, acetic anhydride.

In a specific embodiment, the step of forming an emulsion of PAA droplets in an oil phase comprises forming a solution of PAA in a solvent and stirring the solution in an aqueous phase to form the emulsion.

Polyimide and PAA Matrices with Reactive End Groups

A self-healing polymer material comprising a polyimide matrix with microcapsules dispersed in the matrix, wherein the microcapsules have an outer wall of a polyimide and an inner compartment comprising a PAA; wherein when the microcapsules rupture the PAA interior bonds with the polyimide matrix. The bonding can be by chains of PAA interspersing with polymer chains of the polymer matrix. Or it may be by covalent reaction of reactive groups of the PAA with reactive side groups in the polymer matrix. The reactive groups may be, for instance, the amic acid groups of PAA or reactive end caps, such as vinyl residues from maleic anhydride end caps, or amine or anhydride end groups.

Polyimides are prepared by the condensation reaction of monomers that are di-functional. The basic reaction is the condensation of a dianhydride and a diamine. We have found that by adjusting the ratio of dianhydride to diamine, one can produce polyimides with only anhydride or only amine groups present at the ends of the polymer molecules. Such end groups remain reactive and viable for some time, and should a molecule come in contact with this viable end group that is its reactive counterpart, then a reaction may occur that will increase the length of the polymer chain.

The concept of this embodiment of the invention is a polymer (polyimide or PAA) matrix with an excess of one reactive end group selected from the group consisting of amine and anhydride, and microcapsules containing a monomer or low molecular weight prepolymer or low molecular weight polymer having the complementary reactive group. Should damage occur to the polymer matrix containing these microcapsules, the microcapsules will break, releasing the capsule contents, preferably in liquid form (possibly dissolved in a solvent) into the damaged area. The reactive end groups of the polyimide matrix and the capsule core material are then free to react together to provide a healing material that is bonded intimately into the polymer matrix.

Thus, one embodiment provides a self-healing polymer material comprising: (a) a polymer (polyimide or PAA) matrix, wherein the polyimide has an excess of one reactive end group selected from the group consisting of amine and anhydride; and (b) microcapsules comprising a healing agent that is a monomer, prepolymer, or polymer, the healing agent having an excess of the other reactive end group not in excess in (a) selected from the group consisting of amine and anhydride.

The healing agent should preferably be in liquid form so that upon breakage of the microcapsules, it will flow. It may be liquid in pure form or dissolved in a (preferably low viscosity) liquid solvent.

In a specific embodiment of the self-healing polymer material, the polyimide matrix (a) is formed by the reaction of a diamine and a dianhydride, wherein either the diamine or dianhydride is in excess, and if the diamine is in excess the polyimide has an excess of reactive amine end groups, and if the dianhydride is in excess the polyimide has an excess of reactive anhydride end groups. There can also be other ways of leaving reactive amines or anhydrides on a polymer.

In a specific embodiment, the healing agent of the microcapsules comprises a PAA.

In a specific embodiment, the microcapsules comprise an outer wall and an inner compartment; wherein the outer wall is a polyimide, and the inner compartment comprises a PAA; and wherein the polyimide is formed from the PAA.

In a specific embodiment of the self-healing polymer material with a polymer matrix having reactive end groups and microcapsules with a healing agent having the complementary reactive end group, the microcapsules further comprise a solvent in which the healing agent is dissolved.

Polyimide Matrix with Microcapsules Comprising a Low-Melt Polyimide Healing Agent Another self-healing embodiment for polyimide that we have developed is placing microcapsules in a polyimide matrix, where the microcapsules contain a low-melt polyimide dissolved in solvent. Damage to the matrix and the microcapsules will release the solvent-soluble polyimide, which can heal the damage.

Traditional polyimides are very inert to solvents and do not melt. We have developed a new set of polyimides described above that were originally developed for use as films for the manual repair of high performance electrical wire insulation. See U.S. Patent Application Publication US 2011/0212334 entitled "Low-Melt Poly(amic acids) and Polyimides and their Uses," published on Sep. 1, 2011, and U.S. Provisional Patent Application Ser. No. 61/658,058 entitled "Low-Melt Poly(amic acids) and Polyimides and Their Uses," filed on Jun. 11, 2012. In addition to having a low melting point, these polyimides can be dissolved in some solvents. These properties can be taken advantage of in the self-healing of polyimides, including traditional non-melting polyimides.

Microcapsules containing a solvent-soluble polyimide can be prepared using interfacial or in situ polymerization techniques. The capsules can be incorporated into a low-melt polyimide film or matrix, or a traditional non-melt polyimide film or matrix. The composite materials so formed can be used as a primary electrical wire insulation or as one of a plurality of layers of a composite wire insulation.

Microcapsules can be prepared as described below and as described in U.S. Patent Application Publication Numbers US 2010/0305234 A1 entitled "Hydrophobic-Core Microcapsules and their Formation," published on Dec. 2, 2010, and US 2010/0320421 A1 entitled "Hydrophilic-Core Microcapsules and their Formation," published on Dec. 23, 2010.

The microcapsules are preferably incorporated into a low-melt polyimide matrix that has good or at least minimal solubility with the solvent used to dissolve the polyimide making up the fluid inside the microcapsule. If the matrix also at least partially dissolves in the solvent it will give better intermingling of the polymer strands and better bonding. After the microcapsules break releasing the solvent and dissolved low-melt polyimide, the solvent evaporates over time to leave behind a condensed healed polymer having superior bonding and physical properties.

Thus, one embodiment provides a self-healing polymer material comprising: (a) a polyimide matrix; and (b) microcapsules dispersed in the polyimide matrix and having a wall and an inner compartment, the inner compartment comprising a solvent and a low-melt polyimide having a melting temperature below 200° C.

Low-melt polyimides can be prepared as described above and in U.S. Patent Application Publication US 2011/0212334 entitled "Low-Melt Poly(amic acids) and Polyimides and their Uses," published on Sep. 1, 2011, and U.S. Provisional Patent Application Ser. No. 61/658,058 entitled "Low-Melt Poly(amic acids) and Polyimides and Their Uses," filed on Jun. 11, 2012. They can be prepared, for instance, by polymerization of monomers comprising: a diamine monomer comprising repeating alkyleneoxy segments of 2 to 6 carbon atoms or repeating siloxy segments and having a molecular weight of between 250 and 3,000. The use of end caps that shorten the length of the polyimides (such as MAA, succinic anhydride, and other monoanhydrides, or monoamines) also yield low-melt polyimides, even without necessarily including diamine monomers comprising repeating alkyleneoxy segments of 2 to 6 carbon atoms or repeating siloxy segments and having a molecular weight of between 250 and 3,000.

In a specific embodiment of the self-healing polymer material (i.e., comprising: (a) a polyimide matrix; and (b) microcapsules dispersed in the polyimide matrix and having a wall and an inner compartment, the inner compartment comprising a solvent and a low-melt polyimide having a melting temperature below 200° C.), the solvent, when released from the microcapsules, softens the polyimide matrix and allows for a more intimate bonding of the low-melt polyimide of the microcapsules with the polyimide of the matrix.

In a specific embodiment, the polyimide of the polyimide matrix is a low-melt polyimide that melts at a temperature below 200° C. (or below 300° C., below 250° C., or most preferably below 150° C.).

Another embodiment provides a polymer material comprising: (a) a polymer matrix; and embedded in the matrix, (b) microcapsules wherein the microcapsules are formed by a process comprising reacting a first batch of melamine, formaldehyde, and PTT to form a first prepolymer, and polymerizing the first prepolymer to form a first microcapsule wall layer. Once this wall has been formed a second batch of melamine, formaldehyde, and PTT are reacted to form a second batch of prepolymer and polymerizing the second batch of prepolymer in the encapsulation process to form a second wall layer.

It was found that microcapsules can have their inner contents extracted when coming in contact with various solvents or can even directly leak their contents during the casting or manufacture of a polymer composite comprising microcapsules. Microcapsules formed with a double layer wall formed as described in this paragraph though, were found to have much lower leakage when they were cast into polymer films. Capsule content extraction can also be minimized by performing a post encapsulation treatment via the use of Melamine. Melamine or other reactive amines or aldehydes can react with reactive sites on the wall forming polymer helping to reduce the size of the pores through which extraction takes place.

In a more specific embodiment, the polymer of the polymer matrix is a polyimide.

Another embodiment provides the microcapsules themselves, where the microcapsules are formed by a process comprising: reacting a first batch of melamine, formaldehyde, and PTT to form a first batch of prepolymer, and polymerizing the first batch of prepolymer to form a first wall layer, and adding a second batch of melamine, formaldehyde, and PTT to form a second batch of prepolymer and polymerizing the second batch of prepolymer to form a second wall layer.

Two potential mechanisms were envisioned for how self-healing microcapsules might prove useful as a component in a film, layer, or coating. Depending on the content of the microcapsules, aid to self-healing could be accomplished by having either: 1) capsule content flowing out to fill the damaged area, or 2) capsule content combining/dissolving with the bulk film material to aid in its ability to flow and heal itself. Microcapsules with both types of core content were prepared. Early films prepared with filled microcapsules had inferior physical properties. It was determined that the core content of the capsules had been transported out into the body of the film through a solvent extraction mechanism. This "extraction" occurs when the capsules are mixed with the starting PAA/solvent solution and the wet film is cast and set aside to dry. But we have found that microcapsule walls that were resistant to solvent extraction could be prepared by using a mixture of melamine, formaldehyde, and PTT as the shell wall material.

Table 2 outlines the variations in preparation conditions used in an effort to produce microcapsule walls which resisted leaching of the inner core content in PAA/solvent solutions. The general procedure used for microcapsule preparation follows.

The desired amount of water and desired surfactant are charged to a beaker. This solution is stirred via a shaft stir paddle and warmed to the desired temperature. The desired amounts of shell wall prepolymer components are then added if early prepolymer preparation is desired. If prepolymer components are added at this time, they are allowed to react completely before the oil phase is added. The stir speed is increased to the desired amount and the oil phase is added. A separately prepared shell wall prepolymer can now be added if the shell wall materials are to be added at this time. The emulsion is allowed to stabilize by stirring at speed and temperature for 5-10 minutes. The acid catalyst is then added. A second shell wall prepolymer solution is added 5-10 minutes after catalyst addition if multiple layers of shell polymer are desired. Further shell wall prepolymer additions can be made for more layers.

TABLE 2

Microencapsulation Investigation: Preparation Conditions vs Microcapsule Quality

| Item | Sample ID STJ# | Water Phase (WP) | Oil Phase (OP) | WP/OP | Wall Material. | Cat. Amt.. | Stir Speed | Comments |
|---|---|---|---|---|---|---|---|---|
| 1 | STJ11-96b | 100/1 | 30 g MeBenzoate | 3.3/1 | 2 S -- post E | 2 | 900 | Good capsules, free flowing, fast acetone extraction; fast NMP ext. |
| 2 | 11-96a | 100/1 | 30 g MeBenzoate | 3.3/1 | 1.5 S - pre E; 1 S PC | 2 | 1000 | Capsules clumped together - occurred after PC wall mtl. addn. |
| 3 | 17-1 | 100/1 | 30 g MeBenzoate | 3.3/1 | 2 S -- post E | 1 | 800 | Not free flowing, fast acetone ext. |
| 4 | 17-5b | 100/1 | 30 g MeBenzoate | 3.3/1 | 2 S - post E | 2 | 1000 | No PTT, good capsules, free flow, fast acetone extraction |
| 5 | 17-7 | 100/1 | 30 g MeBenz/PI | 3.3/1 | 2 S - Pre E | 2 | 900 | Capsules clumped together |
| 6 | 17-8 | 140/1 | 30 g MeBenz/PI | 4.7/1 | 2 S - Pre E | 1 | 900 | Free flowing, fast acetone ext. |
| 7 | 17-10 | 150/2 | 30 g MeBenz/PI | 5/1 | 1 S - Post E; 1 S - PC | 2 | 800 | Free Flowing, medium acetone ext. slow or no DMF ext. |
| 8 | 17-13 | 150/2 | 30 g MeBenz/PI | 5/1 | 1 S - Post E; 1 S - PC | 1 | 800 | Poorer capsules, raspberry like. Very high acetone ext. |
| 9 | 17-14 | 150/2 | 30 g MeBenz/PI | 5/1 | 1 S - Post E; 1 S - PC | 4 | 800 | Similar to 7. Poorer yield. |

Water Phase—deionized water with Poly(Na ethylenemaleic anhydride) polymer surfactant; grams water used and percentage of surfactant
Solvent—NMP
Oil Phase—methyl benzoate or polyimide in methyl benzoate (MeBenz/PI), all contained ~0.01% solvent 30 blue dye.
Wall Material—Melamine (M), Formalin (F), and PTT crosslinker; at a standard ratio (S) of (2.0/4.25/0.67)g; amount of each (1S, 2S, etc.) and mode of addition; wall material can be added at three different points in the process - Pre emulsion (Pre E), post emulsion (post E), and post catalyst (PC)
Catalyst amount (Cat. Amt.)—milliliters of 10% $H_2SO_4$ added
Stir Speed—revolutions per minute (RPM)

Materials Development—Film and Microcapsule Combinations

Table 3 highlights composites obtained by mixing various batches of microcapsules with flowable polyimide film. The results reported point out the importance of using microcapsules with shell walls that are resistant to solvent (e.g., DMF and NMP) extraction. Confirmation of microcapsule healing agent core content before addition to the polymer matrix was observed by fourier transform infrared spectroscopy (FT-IR) and scanning electron microscopy (SEM).

TABLE 3

Polyimide Film and Microcapsule Composites.

| Item | Polyimide Film, Sample ID STJ# | Microcapsule Sample ID STJ# | Compoite Film, Sample ID STJ# | Capsule Core Material | Film Observations |
|---|---|---|---|---|---|
| 1 | Polyimide BPADA/XTJ-542/ODA (Table 1, Item 4) | STJ15-13, STJ14-42 | STJ11-73a | Siloxane & Catalyst | Some capsule agglomeration, many empty capsules |
| 2 | Polyimide BPADA/XTJ-542/ODA (Table 1, Item 4) | STJ13-42 | STJ11-73b | MeBenzoate | Capsule agglomeration |

TABLE 3-continued

Polyimide Film and Microcapsule Composites.

| Item | Polyimide Film, Sample ID STJ# | Microcapsule Sample ID STJ# | Compoite Film, Sample ID STJ# | Capsule Core Material | Film Observations |
|---|---|---|---|---|---|
| 3 | Polyimide BPADA/XTJ-542/ODA (Table 1, Item 4) | STJ11-82 | STJ11-85-1 | MeBenz/PI | Capsule agglomeration, sticky |
| 4 | Polyimide BPADA/XTJ-542/ODA/MAA (Table 1, Item 3) | STJ11-82 | STJ11-85-2 | MeBenzPI | Better capsule dispersion, sticky |
| 5 | Polyimide BPADA/XTJ-542/ODA/MAA (Table 1, Item 3) | STJ13-38a | N/A | MeBenzoate | Excellent capsule dispersion, normal film, capsules survive pressing |
| 6 | Polyimide BPADA/XTJ-542/ODA/MAA (Table 1, Item 3) | STJ11-91 | N/A | MeBenzoate | Good capsule dispersion, weak capsules which crushed upon pressing |
| 7 | Polyimide BPADA/XTJ-542/ODA/MAA (Table 1, Item 3) | STJ11-96b | STJ17-2b | MeBenzoate | Good capsule dispersion, blue film due to core leaching |
| 8 | Polyimide BPADA/XTJ-542/ODA/MAA (Table 1, Item 3) | STJ17-10 | STJ17-10b | MeBenz/PI | Excellent capsule dispersion, no film color change, capsules survive pressing |

Materials Development—Laminates

Another embodiment provides a laminate composite structure comprising: two strong polymer film layers, each in contact with a flowable self-healing polymer film layer between the two strong polymer film layers; wherein the strong polymer film layers are mechanically stronger than the self-healing polymer film layer; wherein upon a break or cut through the three polymer film layers, the self-healing polymer flows to form an air-tight seal in the composite structure; wherein the self-healing polymer layer is, or comprises, a polyimide, polyurea, polyurethane, polyamide or polyester.

By the term "film" here, it is meant a layer of polymer from 10 microns to 5 millimeters thick.

In a particular embodiment of the laminate composite structure, the polymer of at least one of the two strong polymer film layers is, or comprises, a polyimide. In a more specific embodiment, the polyimide is an aromatic polyimide.

In a particular embodiment of the laminate composite structure, the polymer of the self-healing polymer film layer is a polyimide. In a more specific embodiment, this polyimide is an aromatic polyimide.

In a specific embodiment of the aromatic polyimide in either the strong layer or the self-healing polymer film layer, the aromatic polyimide is formed by reaction of monomers that comprise one or more aromatic diamine or aromatic dianhydride monomers and one or more flexible long-chain diamine or flexible long chain dianhydride monomers, wherein the mole ratio of aromatic monomers to flexible long chain monomers is between 5:2 and 2:5.

In a more specific embodiment, the monomers further comprise an end cap monomer.

In a specific embodiment of the aromatic polyimide, the flexible long chain aliphatic monomers comprise a polyether or a polysiloxane, such as XTJ-542 or DAPS.

In a specific embodiment of the aromatic polyimide the aromatic monomers comprise BPADA.

In other specific embodiments of the laminate composites, the self-healing polymer layer is, or comprises, a polyimide or a polyurea.

In other specific embodiments of the laminate composites, the self-healing polymer layer is a PAA.

In other specific embodiments of the laminate composites, the self-healing polymer layer is a polyurea or polyurethane and comprises IPDI monomer residues.

Another embodiment provides a fluid-containing object comprising: a wall comprising the laminate composite structure described above, wherein the laminate composite structure surrounds or holds a fluid.

In a particular embodiment, the fluid is a gas. In a more specific embodiment, the fluid-containing object is an inflatable enclosure or habitat.

Another embodiment provides a wire comprising: a central metal conductor surrounded by polymer insulation; wherein the polymer insulation comprises the laminate composite structure described above.

Figure 7:
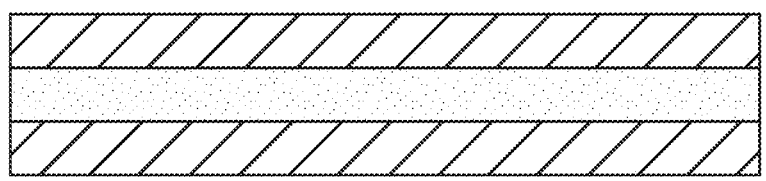
FIG. 7. Diagram of a laminate composite structure of the invention.

Several 3-layer, laminate-like composites (FIG. 7) were prepared consisting of two outer structural films separated by a central layer of self-healing film and compared to a reference Room-Temperature-Vulcanizing (RTV) material as the middle, inner layer. The structural films used were KAPTON or OASIS polyimide, an in-house prepared polyimide manual repair film (Polyimide BPADA/DAPS/ODA/MAA; Table 1, Item 1), or MYLAR. These laminates, which are listed in Table 4, were evaluated to determine if the central layer would perform in the same flowable/self-healing manner as the films on glass as shown in FIGS. 1-5.

TABLE 4

3-Layer Laminate Composites.

| Item | Top & Bottom Structural Layer | Central Self Healing Layer | Total thickness (mil) | Comments |
|---|---|---|---|---|
| 1 | KAPTON (2 mil) | Polyimide BPADA/DAPS (Table 1, Item 26) | 14 | Strongly adhered |

TABLE 4-continued

3-Layer Laminate Composites.

| Item | Top & Bottom Structural Layer | Central Self Healing Layer | Total thickness (mil) | Comments |
|---|---|---|---|---|
| 2 | Siloxane Polyimide Flexible (SPIF) | Polyimide BPADA/XTJ-542/ODA/MAA (Table 1, Item 3) (150° C.) | 26 | |
| 3 | SPIF | Polyimide BPADA/XTJ-542/ODA/MAA (Table 1, Item 3) (200° C.) | N/A | Strong wrinkling and contraction |
| 4 | KAPTON (2 mil) | Polyurea IPDI/XTJ-542 (Table 1, Item 22) | N/A | Polyurea |
| 5 | SPIF | Polyimide (Table 3, Item 8) | 17 | Film/microcapsule composite |
| 6 | SPIF | Polyurea IPDI/XTJ-542 (Table 1, Item 22) | 33 | |
| 7 | MYLAR | Polyimide BPADA/XTJ-542/ODA/MAA (Table 1, Item 8) | 8 | |
| 8 | KEVLAR | Polyimide | 21 | |
| 9 | SPIF | 739 RTV | 33 | |
| 10 | SPIF | 3140 RTV | 27 | |
| 11 | SPIF | 3145 RTV | 36 | |

Figure 8:
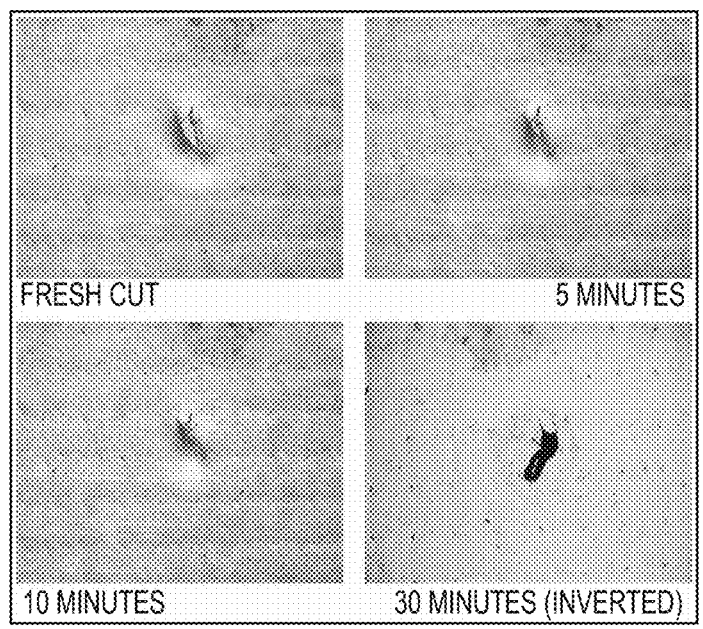
FIG. 8. Self-healing of laminate composite (Table 4, Item 2).

FIG. 8 indicates puncture damage and the progress of self-healing of one such laminate. Self-healing of the puncture proceeds quickly in this structure as compared to the self-healing flow observed in simple "film on glass" cuts.

As the materials described in this patent are intended to represent high performance composites to be used in aviation and space applications it is important to determine their thermal, mechanical, and chemical stability, as well as the required time for self-healing.

Thermal Stability Testing

It is desired that any material utilized in aerospace applications have good thermal properties. Films cured or imidized at both 150° C. and 200° C. are included to understand effects on thermal stability by increasing curing temperatures.

Figure 9:
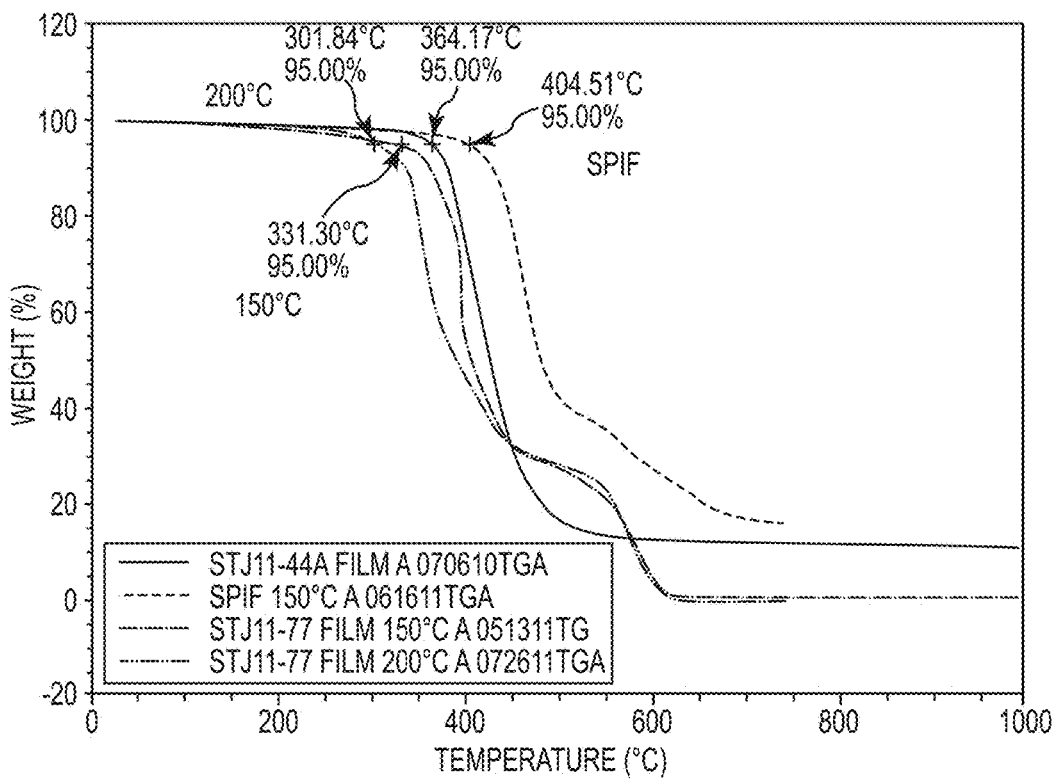
FIG. 9. Thermogravimetric analysis (TGA) of polyimide BPADA/XTJ-542/ODA/MAA (9:7:3:2; Table 1, Item 2) and polyimide BPADA/XTJ-542/ODA/MAA (9:7:3:2; Table 1, Item 3) films cured at 150° C. and 200° C. (Table 1, Items 2 and 3).

Industry typically reports TGA thermal stability data as the temperature at which a 5% weight loss of the material is observed. TGA data for films representing three variations of the standard flowable polyimide formula (BPADA/XTJ-542/ODA/MAA (Table 1, Item 2); BPADA/XTJ-542/ODA/MAA (Table 1, Item 3 cured at 150° C.); and BPADA/XTJ-542/ODA/MAA (Table 1, Item 3 cured at 200° C.) were found to have significant differences in their thermal stability (FIG. 9). TGA data of siloxane polyimide flexible (SPIF), which is a film designed for electrical wire insulation repairs, is also given for reference.

In an attempt to achieve more complete imidization and crosslinking, polymers were made using the basic formulation with several variations of the end cap chemistry. Table 5 shows the TGA information obtained for these various polymers. Polymers BPADA/XTJ-542/ODA (Table 1, Items 4) and BPADA/XTJ-542/DAD (Table 1, Item 7) were prepared without end caps. These two films exhibited the best thermal stability at a 5% weight loss temperature of approximately 367° C. All polymer films with end caps exhibited 5% weight loss temperatures of approximately 335° C. except the polymer which was designed to deliver a very low molecular weight.

TABLE 5

Thermal Stability of Polyimides Test 1

| Material | Temperature for 5% weight loss (° C.) |
|---|---|
| Polyimide BPADA/XTJ-542/ODA/MAA (Table 1, Item 3) | 331 |
| Polyimide BPADA/XTJ-542/ODA (Table 1, Item 4) | 369 |
| Polyimide BPADA/XTJ-542/ODA (Table 1, Item 5) | 258 |
| Polyimide BPADA/XTJ-542/ODA/C8Succan (Table 1, Item 6) | 339 |
| Polyimide BPADA/XTJ-542/DAD (Table 1, Item 7) | 367 |
| Polyimide BPADA/XTJ-542/ODA/MAA (Table 1, Item 8) | 331 |
| Polyimide BPADA/XTJ-542/ODA/MAA/Succan (Table 1, Item 9) | 316 |
| Polyimide BPADA/XTJ-542/ODA/Succan (Table 1, Item 10) | 332 |

Table 6 is a compilation of polymers in which changes in a dianhydride or aromatic diamine were made. No significant improvements in thermal stability (or self-healing) were observed by these changes. The "baseline" polymer represented by polyimide BPADA/XTJ-542/ODA/MAA (Table 1, Item 3) exhibited the best thermal stability of this group of polymers.

TABLE 6

Thermal Stability of Polyimides Test 2

| Material | Temperature for 5% weight loss (° C.) |
|---|---|
| Polyimide BPADA/XTJ-542/ODA/MAA (Table 1, Item 3) | 331 |
| Polyimide BPDA/XTJ-542/ODA/Succan (Table 1, Item 16) | 294 |
| Polyimide BPADA/XTJ-542/TDA/Succan (Table 1, Item 17) | 325 |

TABLE 6-continued

Thermal Stability of Polyimides Test 2

| Material | Temperature for 5% weight loss (° C.) |
|---|---|
| Polyimide BPADA/XTJ-542/DASO/Succan (Table 1, Item 18) | 314 |
| Polyimide BPADA/XTJ-542/DABA/Succan (Table 1, Item 19) | 304 |

Table 7 presents the thermal stability data of several polyureas and urethanes prepared as potential self-healing films. Most of these had diminished thermal stability when compared to polyimides; however, the polyurea (Table 1, Item 22) with a 5% weight loss temperature of 299° C. performed as well as some polyimides.

TABLE 7

Thermal Stability Test for Polyureas

| Material | Temperature for 5% weight loss (° C.) |
|---|---|
| Polyurea TDI/DAPS (Table 1, Item 21) | 243 |
| Polyurea IPDI/XTJ-542 (Table 1, Item 22) | 299 |
| Polyurea IPDI/DAPS (Table 1, Item 23) | 275 |
| Polyurea IPDI/Siloxane Diol (Table 1, Item 24) | 227 |

Table 8 shows the 5% weight loss data for several polymer films that had microcapsules added. The microcapsule loading for each film was approximately 25% (by weight).

TABLE 8

Thermal Stability Test for Polyimides with Microcapsules Added

| Material | Temperature for 5% weight loss (° C.) |
|---|---|
| Polyimide BPADA/XTJ-542/ODA/MAA (Table 1, Item 3) | 331 |
| Polyimide BPADA/XTJ-542/ODA (Table 1, Item 4) | 369 |
| Polyimide BPADA/XTJ-542/ODA (Table 3, Item 1) | 196 |
| Polyimide BPADA/XTJ-542/ODA/MAA (Table 3, Item 5) | 243 |
| Polyimide BPADA/XTJ-542/ODA (Table 3, Item 3) | 304 |
| Polyimide BPADA/XTJ-542/ODA/MAA (Table 3, Item 4) | 231 |
| Polyimide BPADA/XTJ-542/ODA/MAA (Table 3, Item 7) | 285 |
| Polyimide BPADA/XTJ-542/ODA/MAA (Table 3, Item 8) | 246 |

Figure 10:
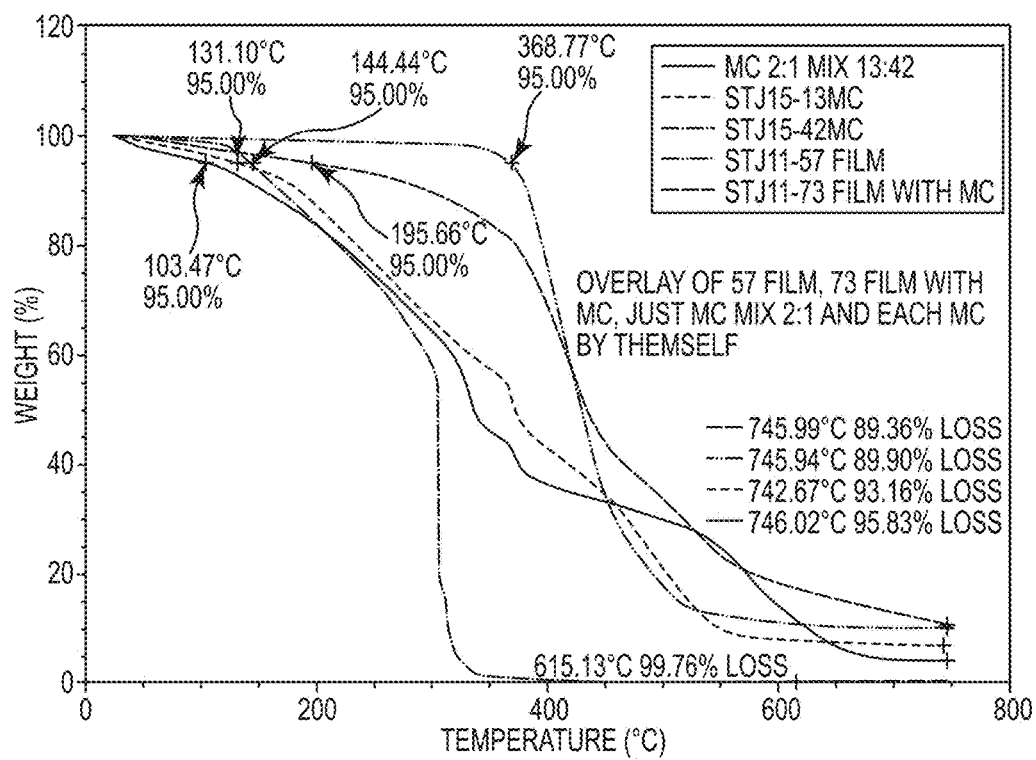
FIG. 10. TGA comparison of film/capsule composite components (Table 3, Item 1).

FIG. 10 highlights the differences between the three different aspects of these film/microcapsule composites. As expected, the highest thermal stability is exhibited by the film itself, lowest are the microcapsule components, and intermediate is the film/capsule composite.

Mechanical Stability Testing

Samples of each material underwent tensile testing using an Instron Model 3344 Universal Testing Machine. Each sample was cast, baked, and cut using a razor blade into rectangular strips approximately 6 mm wide and 0.3 mm thick.

The mechanical data collected indicates that many of the self-healing/flowable films are very elastic and have extensions at break ranging from 150-420 mm. Films containing microcapsules were less elastic, with extension at break averaging 103 mm.

Healing Time versus Thickness—Flat Surfaces

A series of tests were conducted to determine the healing rate of thin films of various thicknesses versus time. Three film thicknesses, 5, 10, and 15 mils, were evaluated as part of this testing. Each film sample was placed on a microscope slide to provide a rigid surface to allow surface damage to the films. The damage was induced using a 0.500 mm diameter needle. The five film materials evaluated as part of this testing were polyimide BPADA/XTJ-542/ODA/MAA (Table 1, Item 3, cured at 150° C.), polyimide BPADA/XTJ-542/ODA/MAA (Table 1, Item 3, cured at 200° C.), polyimide BPADA/XTJ-542/ODA/MAA (Table 1, Item 3, cured at 150° C.), BPADA/XTJ-542/ODA/MAA (Table 1, Item 2, cured at 150° C.), and polyimide BPADA/XTJ-542/ODA/MAA with microcapsules added (Table 3, Item 5, cured at 150° C.). The healing rate was monitored and photographed at regular intervals using a Caltex optical microscope.

Figure 11:
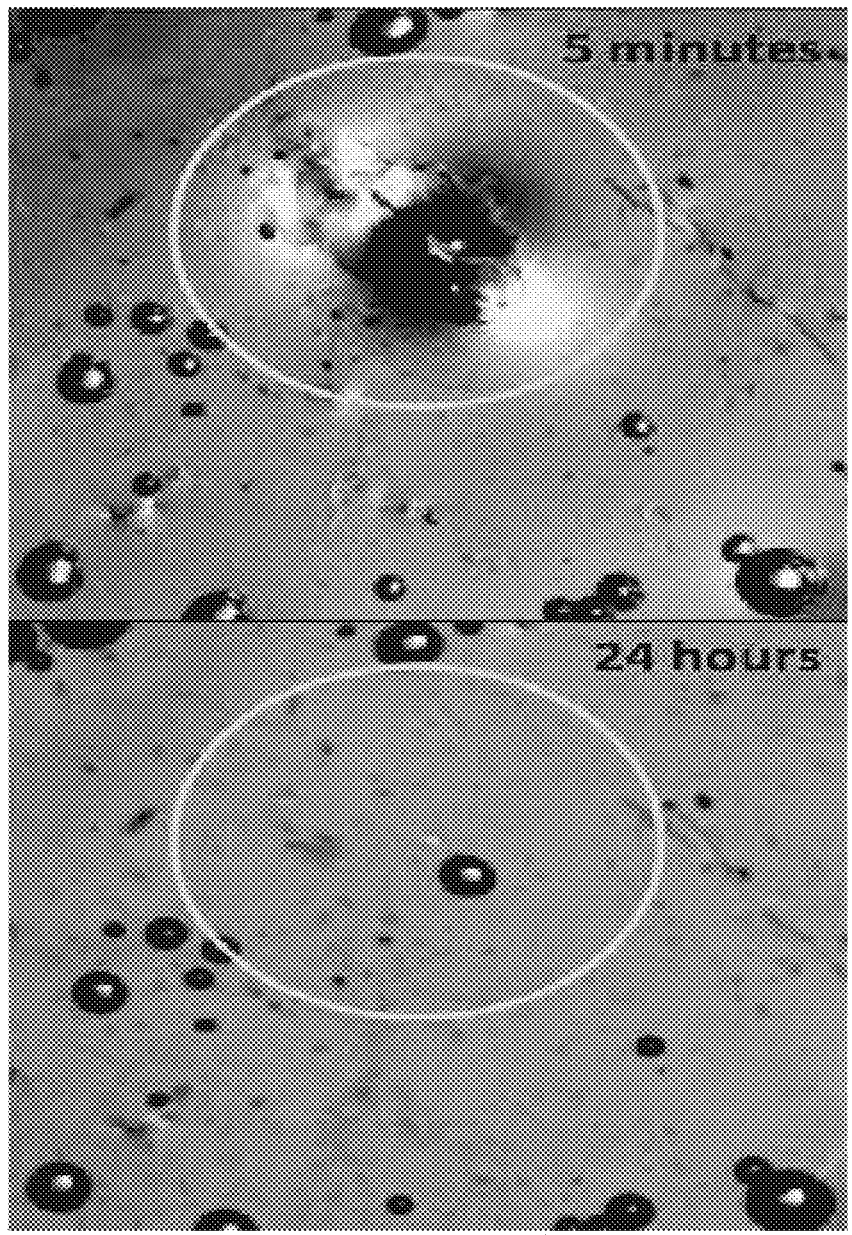
FIG. 11. Micrograph of self-healing/sealing film after puncture damage.
Figure 12:
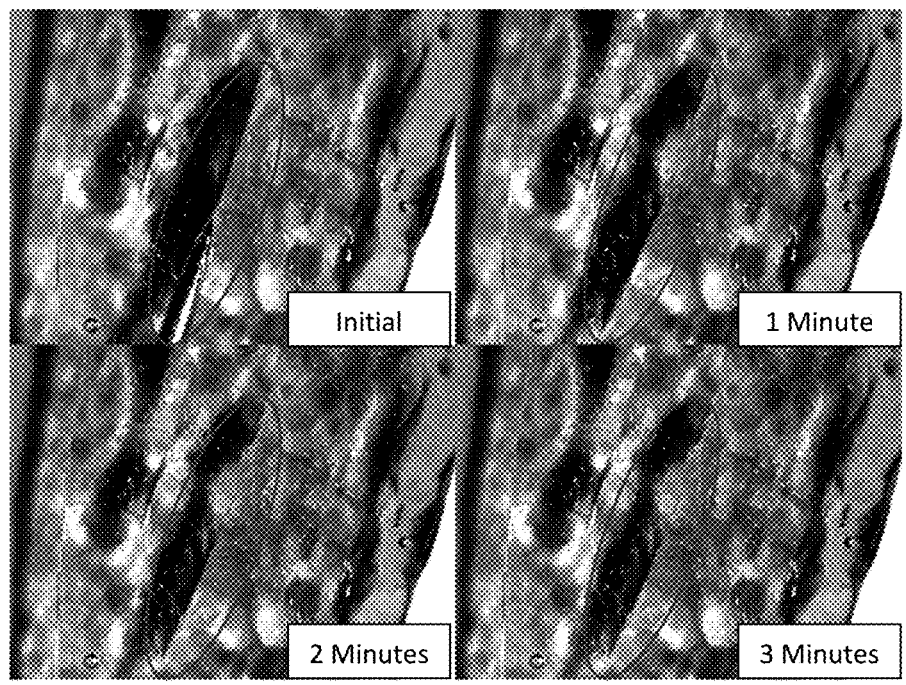
FIG. 12. Micrograph showing self healing of polyimide BPADA/XTJ-542/ODA/MAA (9:7:3:2; Table 1, Item 3) (150° C. cure) after surface damage with a needle. Clockwise from upper left, panels show the material at 0 minutes after damage (initial), 1 minute, 3 minutes, and 2 minutes after damage.
Figure 13:
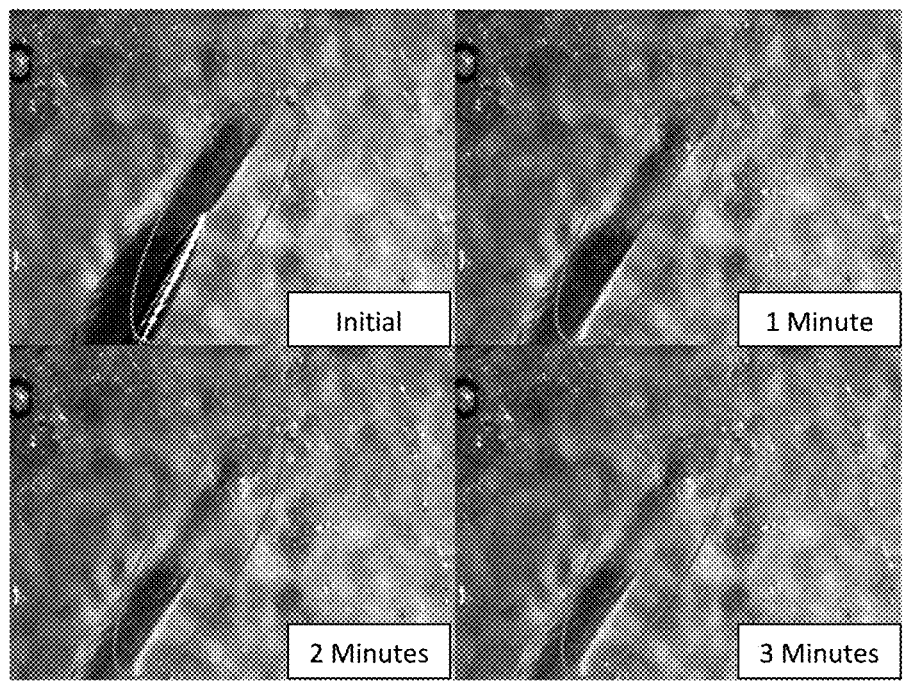
FIG. 13. Micrograph showing self healing of polyimide BPADA/XTJ-542/ODA/MAA (9:7:3:2; Table 1, Item 3) (200° C. cure) after surface damage with a needle. Clockwise from upper left, panels show the material at 0 minutes after damage (initial), 1 minute, 3 minutes, and 2 minutes after damage.
Figure 14A:
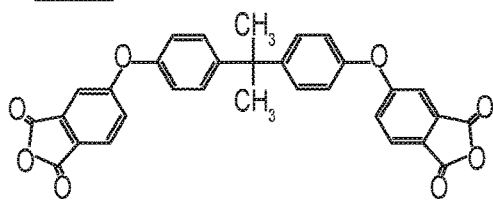
FIGS. 14A, 14B, and 14C. Chemical structures and acronyms referenced in this document.
Figure 14A:
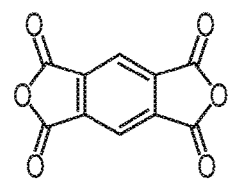
Figure 14A:
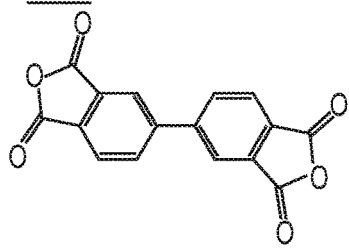
Figure 14A:
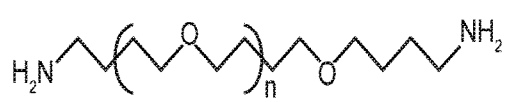
Figure 14A:
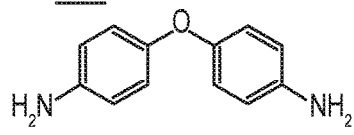
Figure 14A:
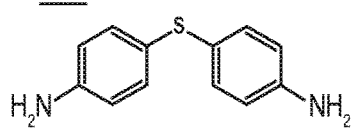
Figure 14A:
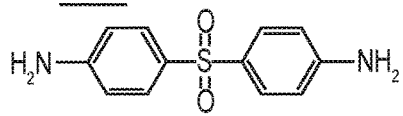
Figure 14A:
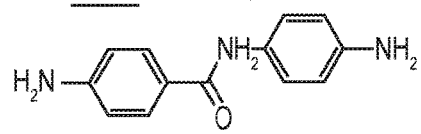
Figure 14B:
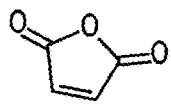
Figure 14B:
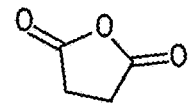
Figure 14B:
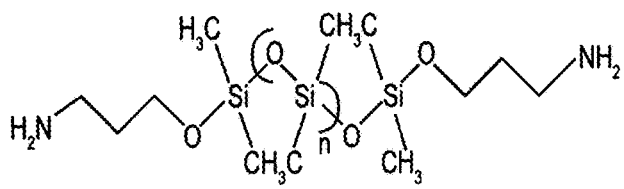
Figure 14B:
Figure 14B:
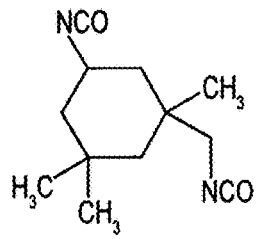
Figure 14B:
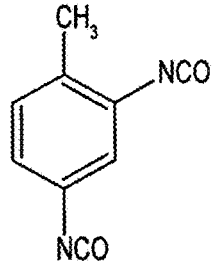
Figure 14B:
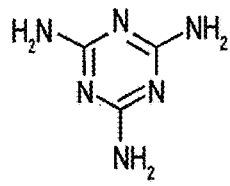
Figure 14C:
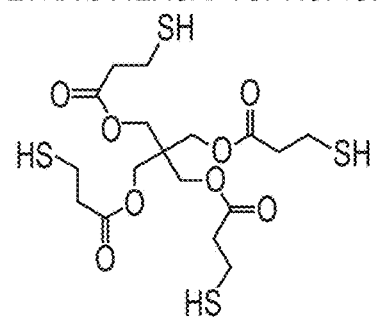
Figure 14C:
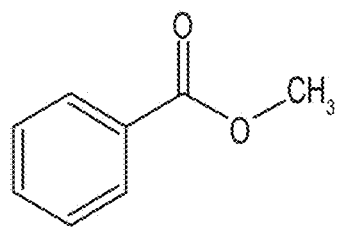

The data indicate that several of the film materials have potential for use in self-healing, flexible systems. The films that performed best were polyimide BPADA/XTJ-542/ODA/MAA (Table 1, Item 3, cured at 150° C.), polyimide BPADA/XTJ-542/ODA/MAA (Table 1, Item 3, cured at 200° C.), and polyimide BPADA/XTJ-542/ODA/MAA (Table 1, Item 8, cured at 150° C.). Both polyimide BPADA/XTJ-542/ODA/MAA (Table 1, Item 3, cured at 200° C.) and polyimide BPADA/XTJ-542/ODA/MAA (Table 1, Item 8, cured at 150° C.) showed significant healing after 4 hours when thicknesses of material was at least 10 mils. Polyimide BPADA/XTJ-542/ODA/MAA (Table 1, Item 3, cured at 150° C.) showed significant healing after 24 hours when thickness of material was at least 10 mils. It should be noted that the damage size was a key variable and it was very difficult to induce consistent damages to each material under evaluation. Pictorial representation of a flowable film that was able to self-heal damage without the use of external stimulus in less than 24 hours, without scarring is shown in FIG. 11. Further demonstration of the self-healing/flowable properties of these systems is shown in the time-lapse images (shown in FIGS. 12 and 13) taken after inducing surface damage using a 0.5 mm diameter needle. FIG. 12 shows the healing/sealing of damage for polyimide BPADA/XTJ-542/ODA/MAA (Table 1, Item 3, cured at 150° C.). FIG. 13 shows the healing/sealing of damage for BPADA/XTJ-542/ODA/MAA (Table 1, Item 3, cured at 200° C.). It should be noted that the damage was only to the surface of the materials (approximately 25% of the sample thickness) and that the study only lasted 3 minutes due to limitations of the time-lapse software. After 24 hours both samples were completely healed.

Tests were also conducted to determine healing rates of thin films coated onto various substrates. The substrates used in these tests were copper-coated KAPTON, aluminum-coated PTFE, and OASIS film, and the two film materials evaluated were polyimide BPADA/XTJ-542/ODA/MAA (Table 1, Item 3) and polyimide BPADA/XTJ-542/ODA/MAA (Table 1, Item 8).

The data indicate that the substrate to which the self-healing materials are bonded influences the rate of self-healing for the system. For example, polyimide BPADA/XTJ-542/ODA/MAA (Table 1, Item 8) partially heals when bonded to copper-coated KAPTON but does not heal at all when bonded to aluminum-coated PTFE. Also, polyimide BPADA/XTJ-542/ODA/MAA (Table 1, Item 3) does not show significant healing when bonded to either copper-coated KAPTON or OASIS film, but does heal when placed on a glass microscope slide.

Healing Time for Laminate Systems—Pressure Study

The laminate-like test specimens were cut into 45 mm diameter circles for evaluation in a pressure testing apparatus. Each cut specimen was placed in the test apparatus and the system was pressurized to 19.5 psi to determine if there were any leaks present. Once the system was shown to be pressure tight, the specimen under evaluation was removed from the testing apparatus, punctured with a 0.500 mm needle, and allowed to stand at room temperature (approximately 22° C.) for the specified time before re-testing.

The data indicate that several of the laminate composites show promise for use in self-healing/sealing inflatable systems. The laminate composites IPDI/XTJ-542 (Polyurea; Table 1, Item 22) and BPADA/XTJ-542/ODA/MAA (Polyimide; Table 1, Item 3, cured at 150° C.) performed best of the systems evaluated. The system containing polyurea IPDI/XTJ-542 (Table 1, Item 22) sealed in 2 hours (or less) and the system containing polyimide BPADA/XTJ-542/ODA/MAA (Table 1, Item 3, cured at 150° C.) sealed in 4 hours (or less). The laminate composite containing polyimide BPADA/DAPS (Table 1, Item 26) sealed in 24 hours (or less). It should be noted that the exact time required to seal is not known since measurements were made at predetermined intervals.

The self-healing polymer materials described herein do not need to comprise a polymerization catalyst in order to self-heal. This is one advantage of the materials. Thus, the polymer materials preferably do not comprise a polymerization catalyst. Preferably neither the polymer matrix nor the microcapsules embedded in the polymer matrix comprise a polymerization catalyst.

Another embodiment of the invention provides a polyimide formed by polymerization of monomers consisting essentially of:
- (a) BPADA, DAPS, ODA, and MAA, in a BPADA/DAPS/ODA/MAA mole ratio of about 9:8:2:2;
- (b) BPADA, XTJ-542, ODA, and MAA in a BPADA/XTJ-542/ODA/MAA mole ratio of about 9:7:3:2;
- (c) BPADA, XTJ-542, and ODA in a BPADA/XTJ-542/ODA mole ratio of about 10:7:3 to about 8:7:3;
- (d) BPADA, XTJ-542, ODA, and C8Succan in a BPADA/XTJ-542/ODA/C8Succan mole ratio of about 9:7:3:2;
- (e) BPADA, XTJ-542, and DAD in a BPADA/XTJ-542/DAD mole ratio of about 9:6:4;
- (f) BPADA, XTJ-542, ODA, and MAA in a BPADA/XTJ-542/ODA/MAA mole ratio of about 9:7:3:1;
- (g) BPADA, XTJ-542, ODA, MAA, and Succan in a BPADA/XTJ-542/ODA/MAA/Succan mole ratio of about 9:7:3:1:1;
- (h) BPADA, XTJ-542, ODA, and Succan in a BPADA/XTJ-542/ODA/Succan mole ratio of about 9:6.5:3.5:2;
- (i) BPADA, XTJ-542, TDA, and Succan in a BPADA/XTJ-542/TDA/Succan mole ratio of about 9:7:3:2; or
- (j) BPADA, XTJ-542, DASO, and Succan in a BPADA/XTJ-542/DASO/Succan mole ratio of about 9:7:3:2.

Another embodiment provides a polyurea or polyurethane formed by polymerization of monomers consisting essentially of:
- (a) IPDI and XTJ-542 in a mole ratio of about 9:10;
- (b) IPDI and DAPS in a mole ratio of about 9:10; or
- (c) IPDI and siloxane diol in a mole ratio of about 9:10.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

We claim:

1. A polymer material comprising:
a polymer matrix that flows at approximately 23° C., or about room temperature, wherein the polymer of the polymer matrix is formed by polymerization of monomers comprising:
(a) a diamine monomer comprising repeating alkyleneoxy segments of 2 to 6 carbon atoms or repeating siloxy segments and having a molecular weight of between 250 and 3,000; and
(b) a dianhydride monomer;
wherein the polymer material is a film or layer 50 microns to 5 mm thick and when the film or layer is cut into two pieces, and the two pieces placed laterally in contact with or near to each other, the pieces of the film or layer flow back together at approximately 23° C., or about room temperature within 30 days and molecularly combine.

2. The polymer material of claim 1, wherein the dianhydride monomer is an aromatic dianhydride.

3. The polymer material of claim 1, wherein the dianhydride monomer is bisphenol A dianhydride (BPADA), biphenyl dianhydride (BPDA), or benzophenone-3,3',4,4'-tetracarboxylic dianhydride.

4. The polymer material of claim 3, wherein the monomers further comprise an aromatic diamine monomer selected from the group consisting of ODA, TDA, and DASO.

5. The polymer material of claim 3, wherein the dianhydride monomer is BPADA.

6. The polymer material of claim 5, wherein the monomers further comprise an end capping group that is a monoamine or a monoanhydride.

7. The polymer material of claim 1, wherein the monomers further comprise an aromatic diamine monomer.

8. The polymer material of claim 7, wherein the aromatic diamine monomer is oxydianiline (ODA), thiodianiline (TDA), or dianilinesulfone (DASO).

9. The polymer material of claim 1, wherein the monomers further comprise an end capping group.

10. The polymer material of claim 9, wherein the end capping group is not cross-linkable.

11. The polymer material of claim 9, wherein the end capping group is a monoamine or monoanhydride.

12. The polymer material of claim 11, wherein the end capping group is maleic anhydride (MAA), succinic anhydride (Succan), or C8-succinic anhydride (C8Succan).

13. The polymer material of claim 12, wherein the end capping group is MAA.

14. The polymer material of claim 1, wherein the monomers further comprise ODA, TDA, DASO, or diaminododecane (DAD).

15. The polymer material of claim 1, wherein the monomers further comprise a diamine selected from the group consisting of ODA, TDA, DASO, and diaminododecane (DAD); and the monomers further comprise a monoamine or monoanhydride.

* * * * *